United States Patent
Baker et al.

(10) Patent No.: US 12,490,358 B2
(45) Date of Patent: Dec. 2, 2025

(54) SYSTEM HAVING DIMMERS AND LIGHTING DEVICES CONFIGURED FOR PHASE-CONTROL DIMMING AND DIGITAL COMMUNICATION

(71) Applicant: Lutron Technology Company LLC, Coopersburg, PA (US)

(72) Inventors: Rhodes B. Baker, Allentown, PA (US); Gerard Darville, Macungie, PA (US); Matthew V. Harte, Stewartsville, PA (US); Robert C. Newman, Jr., Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 173 days.

(21) Appl. No.: 18/279,901

(22) PCT Filed: Mar. 2, 2022

(86) PCT No.: PCT/US2022/018572
§ 371 (c)(1),
(2) Date: Sep. 1, 2023

(87) PCT Pub. No.: WO2022/187400
PCT Pub. Date: Sep. 9, 2022

(65) Prior Publication Data
US 2024/0155751 A1 May 9, 2024

Related U.S. Application Data

(60) Provisional application No. 63/155,584, filed on Mar. 2, 2021.

(51) Int. Cl.
*H05B 45/31* (2020.01)
*H05B 47/19* (2020.01)

(52) U.S. Cl.
CPC ............. *H05B 45/31* (2020.01); *H05B 47/19* (2020.01)

(58) Field of Classification Search
CPC .......... H05B 47/19–199; H05B 47/185; H05B 45/31; H05B 47/196; H05B 47/199; Y02B 20/40
See application file for complete search history.

(56) References Cited

U.S. PATENT DOCUMENTS 10,314,137 B1   6/2019 Lai
2017/0244249 A1*  8/2017 Marinus ............... H05B 47/105
(Continued)

*Primary Examiner* — Renan Luque
(74) *Attorney, Agent, or Firm* — Flaster Greenberg P.C.

(57) ABSTRACT

A smart lighting device may be configured to be controlled in response to control instructions in messages and/or phase-control signals. The smart lighting device may determine whether to respond to the phase-control signal or the control instructions in messages. The smart lighting device may be configured to recognize whether it is electrically connected to a smart load control device or a non-smart load control device. A load control device may determine whether it is electrically connected to a mixed circuit or a non-mixed circuit. When the load control device determines that the circuit is a mixed circuit, the load control device may transmit phase-control signals and control instructions in messages at the same time. The load control device may determine that a smart lighting device has been added (e.g., electrically connected) to the circuit it is electrically connected to.

34 Claims, 14 Drawing Sheets

(56) References Cited

U.S. PATENT DOCUMENTS

2020/0288558 A1    9/2020  Anderson et al.
2022/0304129 A1*   9/2022  Hansston ............. H05B 47/185

* cited by examiner

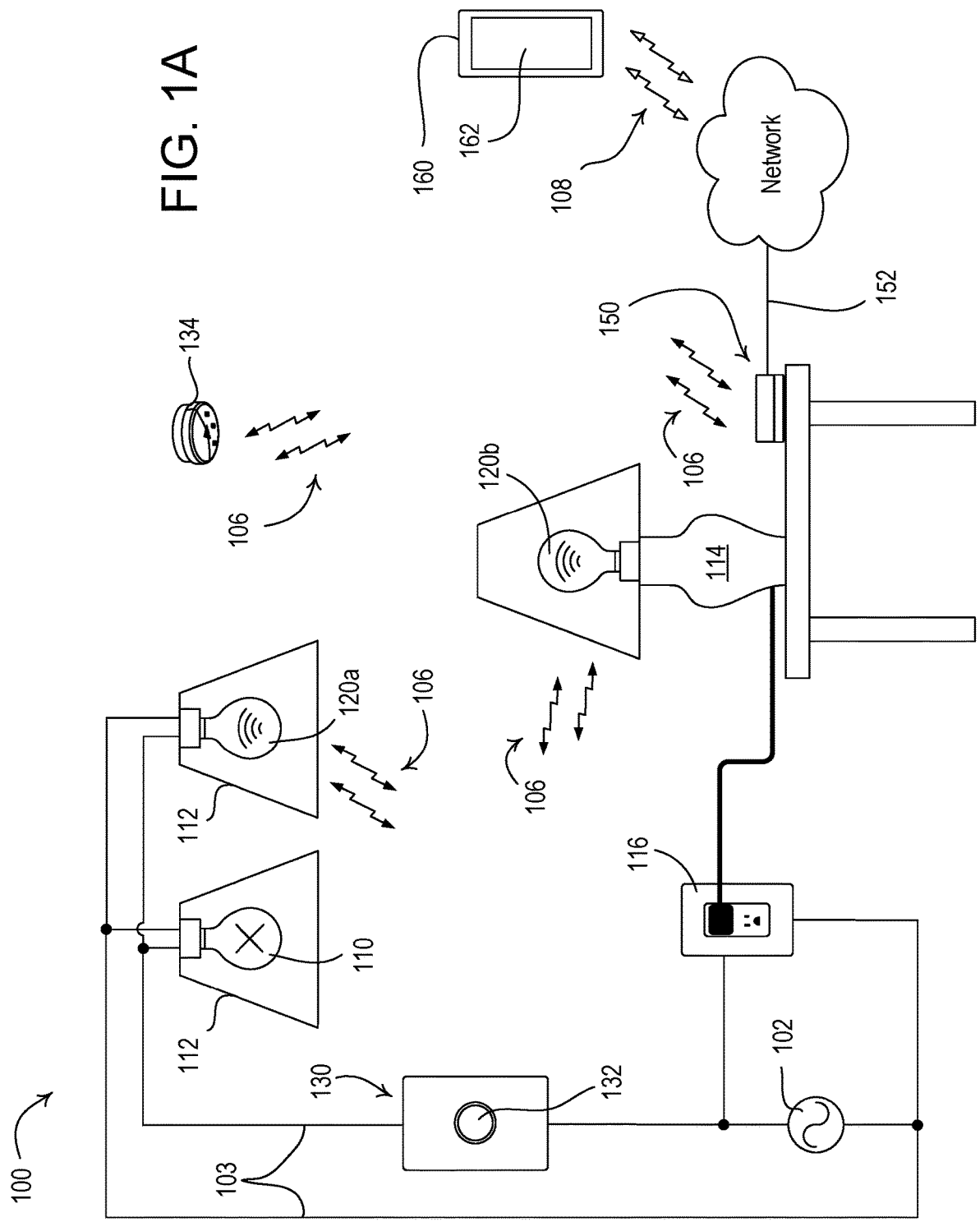

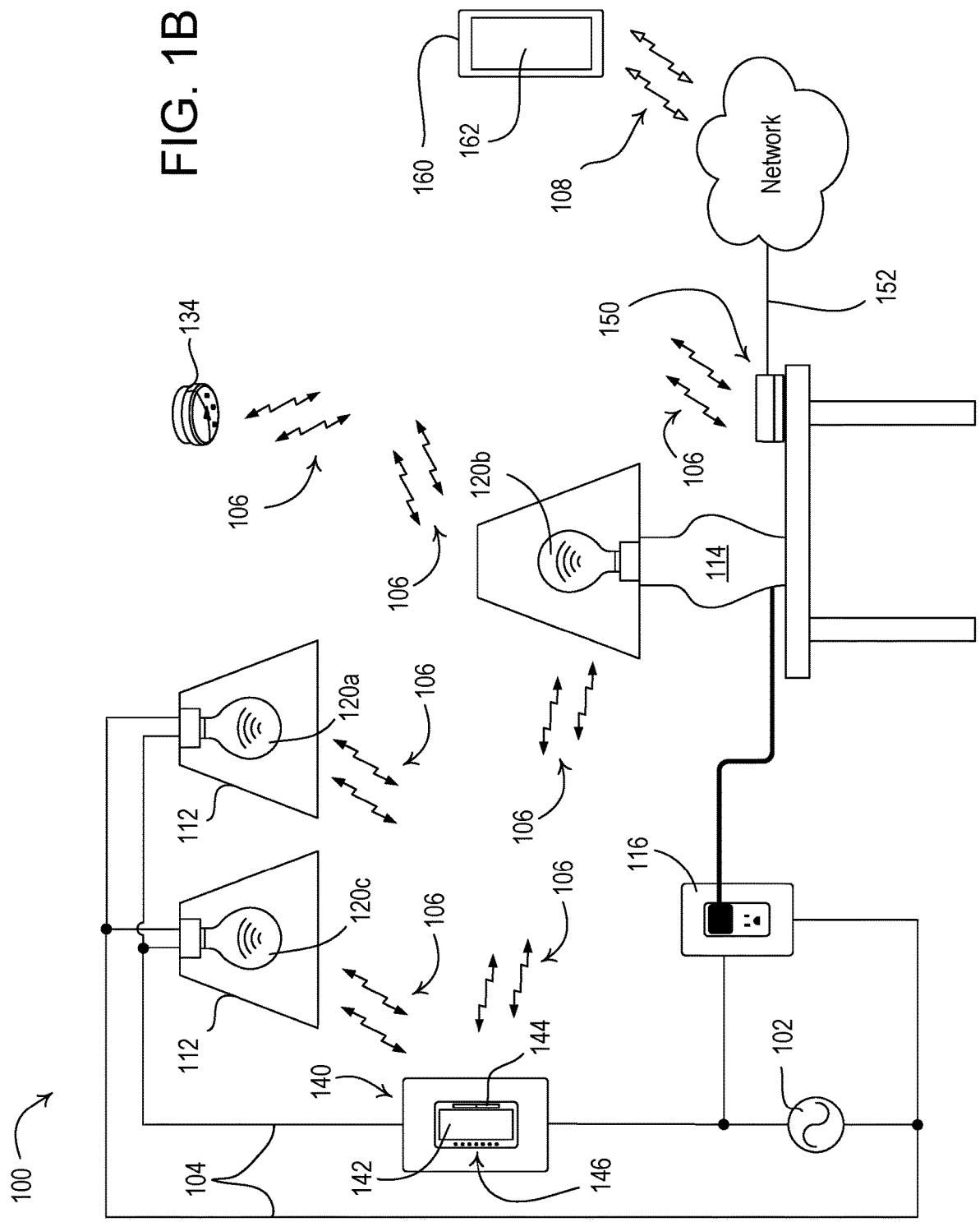

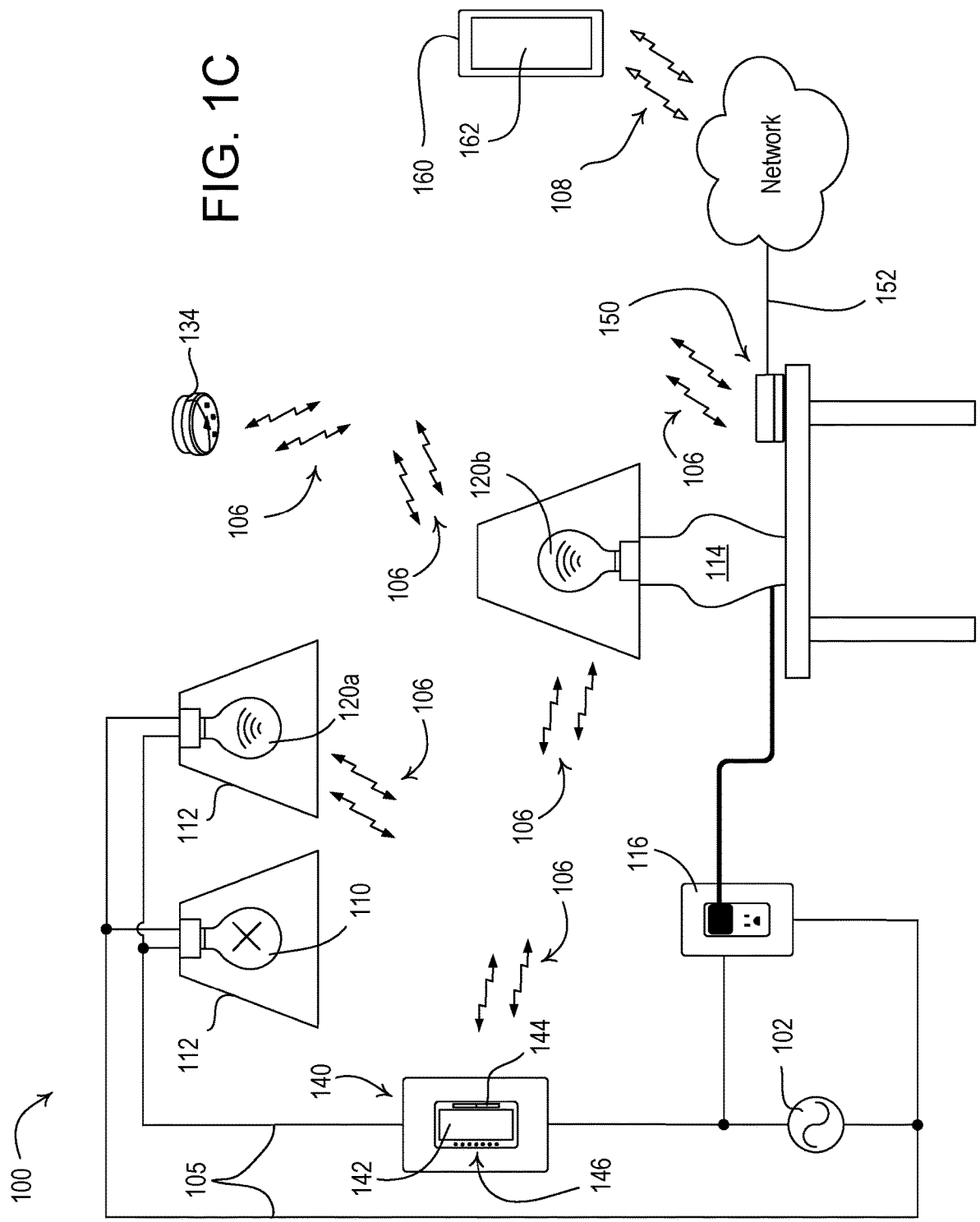

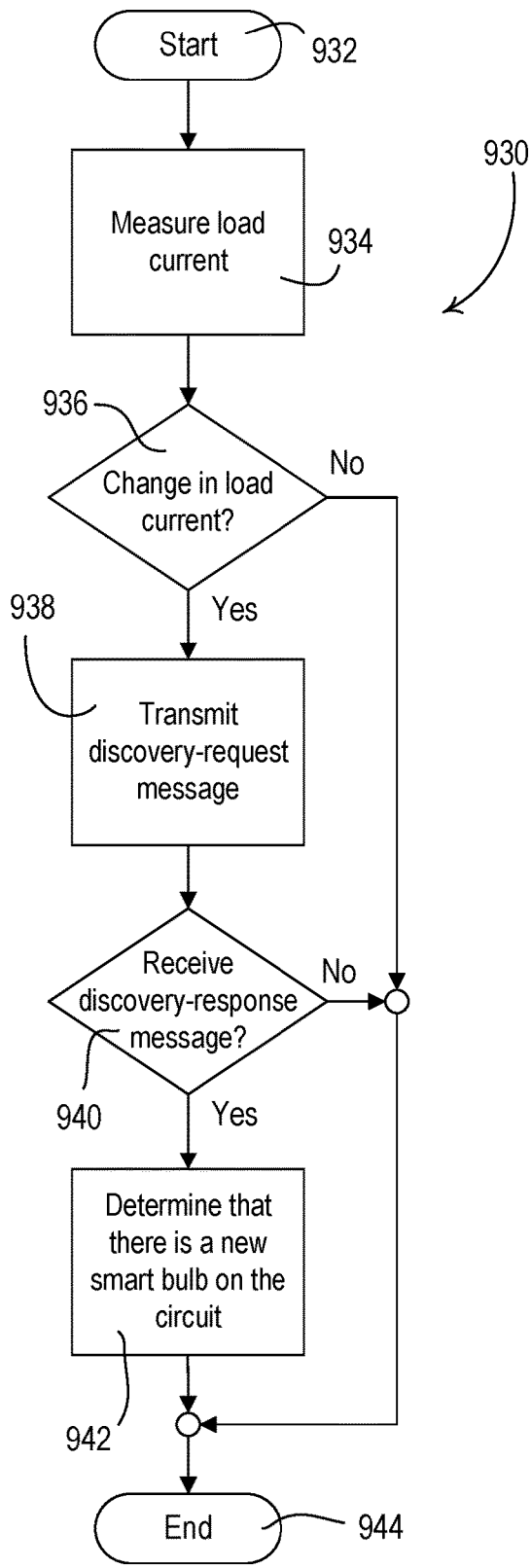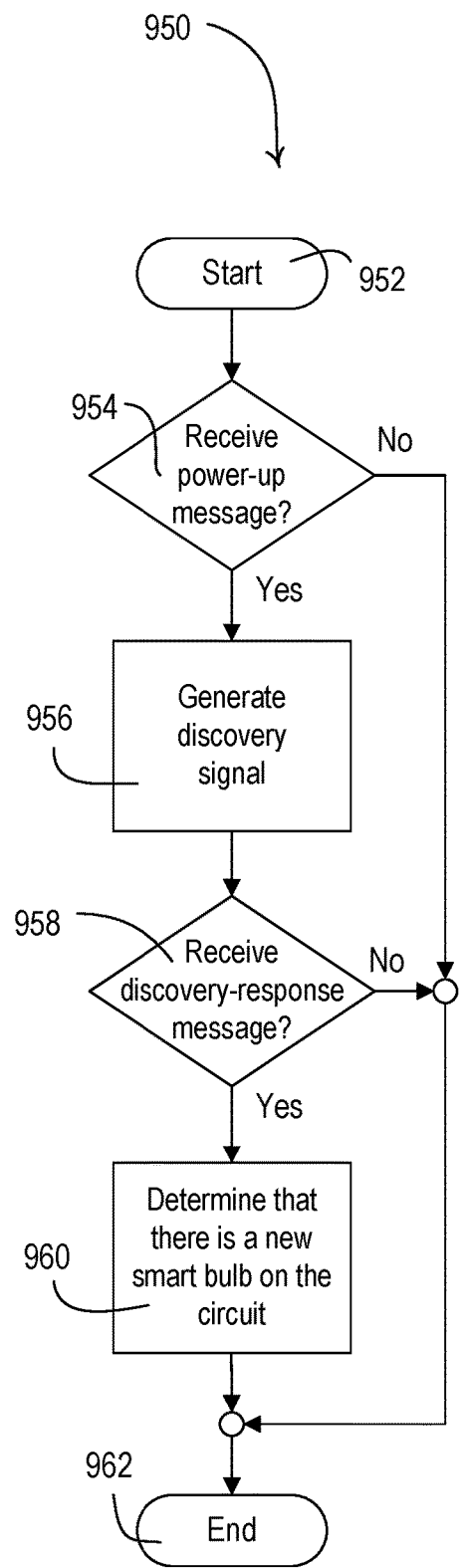
FIG. 9B
FIG. 9C

SYSTEM HAVING DIMMERS AND LIGHTING DEVICES CONFIGURED FOR PHASE-CONTROL DIMMING AND DIGITAL COMMUNICATION

CROSS-REFERENCE TO RELATED APPLICATIONS

This application is the 371 National Stage of International Application No. PCT/US2022/018572, filed Mar. 2, 2022, which claims priority to U.S. Provisional Application No. 63/155,584, filed Mar. 2, 2021, the disclosures of which are incorporated herein by reference in their entireties.

BACKGROUND

A user environment, such as a residence or an office building for example, may be configured using various types of load control systems. A lighting control system may be used to control the lighting loads in the user environment. Each load control system may include various control devices, including input devices and load control devices. The load control devices may receive digital messages, which may include load control instructions, for controlling an electrical load from one or more of the load control devices. The load control devices may be capable of directly controlling an electrical load. The input devices may be capable of indirectly controlling the electrical load via the load control device. Examples of load control devices may include lighting control devices (e.g., a dimmer, a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, temperature sensors, and/or the like.

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

SUMMARY

As described herein, a smart lighting device may be configured to be controlled in response to wireless control (e.g., control instructions in messages). For example, the smart lighting device may adjust a characteristic (e.g., intensity, color, hue, etc.) in response to the control instructions in messages. Smart lighting devices may be deployed in various load control systems having various configurations. For example, a smart lighting device may be deployed in a load control system having a load control device (e.g., such as a dimmer) that is a smart load control device. The load control device may be considered smart if it is capable of transmitting and/or receiving control instructions in messages. Alternatively, a smart lighting device may be deployed in a load control system having a non-smart load control device.

A smart lighting device may be configured to recognize whether it is electrically connected to a smart load control device or a non-smart load control device. The smart lighting device may detect a phase-control signal. Receipt of the phase-control signal may indicate that the smart lighting device is electrically connected to a non-smart load control device. The smart lighting device may provide feedback to the user when it determines that it is electrically connected to the non-smart load control device. For example, the smart lighting device may indicate to a user that the non-smart load control device should be replaced with a smart load control device.

A smart lighting device may determine control instructions in response to a phase-control signal and/or received messages. The smart lighting device may determine whether to respond to control instructions determined from the phase-control signal or the received messages. For example, the smart lighting device may decide whether to control its lighting load in response to control instructions received via the phase-control signal or in the received messages. The smart lighting device may ignore the phase-control signal and control its lighting load in response to the control instructions in messages. The smart lighting device may control its lighting load in response the phase-control signal if it stops receiving the control instructions in messages.

A load control device may determine whether it is electrically connected to a mixed circuit (e.g., one or more smart lighting devices and one or more non-smart lighting devices) or a non-mixed circuit (e.g., all smart lighting devices or all non-smart lighting devices). The load control device may determine whether the circuit is a mixed circuit by turning off the smart lighting devices and measuring an amount of light in the space. The load control device may determine how to control the smart lighting device, for example, based on whether the circuit is a mixed circuit or a non-mixed circuit. When the load control device determines that the circuit is a non-mixed circuit with all smart lighting devices, the load control device may enter a maintained conduction mode. When the load control device determines that the circuit is a mixed circuit, the load control device may generate a phase-control signal and transmit control instructions in messages at the same time. When the load control device determines that the circuit is a mixed circuit, the load control device may adjust a dimming range of one or more smart lighting devices to match a dimming range of one or more non-smart lighting devices electrically connected to the circuit.

A load control device may determine that a smart lighting device has been added (e.g., electrically connected) to the circuit it is electrically connected to. For example, the load control device may detect a change in output current and may transmit a message to discover the added smart lighting device. Alternatively or additionally, the load control device may receive an initial message from the smart lighting device. The load control device may determine whether the smart lighting device that sent the initial message is electrically connected to the circuit that it controls. For example, the load control device may adjust (e.g., wiggle) a phase angle of a phase-control signal and wait for a response from the smart lighting device. The load control device may associate (e.g., automatically) with the added smart lighting device. The load control device may program (e.g., automatically) the added smart lighting device. For example, the load control device may program the added smart lighting device with one or more control features (e.g., operational parameters) of another smart lighting device that is being replaced by the smart lighting device or one or more other lighting devices (e.g., smart lighting devices or non-smart lighting devices) electrically connected to the circuit.

The load control device may associate and/or program a smart lighting device that is added to the circuit controlled by the load control device. The load control device may automatically associate with the smart lighting device, when the load control device detects that the smart lighting device has been added to the circuit. The load control device may automatically program the smart lighting device, when the load control device detects that the smart lighting device has been added to the circuit. For example, the load control device may program the added smart lighting device using one or more operational parameters of a smart lighting device that the added smart lighting device is replacing. Alternatively or additionally, the load control device may program the added smart lighting device using one or more operational parameters associated with other smart lighting devices electrically connected to the same circuit and/or in the same room as the added smart lighting device.

BRIEF DESCRIPTION OF THE DRAWINGS

FIGS. 1A-1C depict an example load control systems that include one or more control devices and one or more smart lighting devices.

FIGS. 9B and 9C are flowcharts depicting example methods that may be executed by a smart load control device for determining whether a new smart bulb has been installed on a circuit (e.g., a dimmed-hot circuit) of the smart load control device.

DETAILED DESCRIPTION

Figure 2:
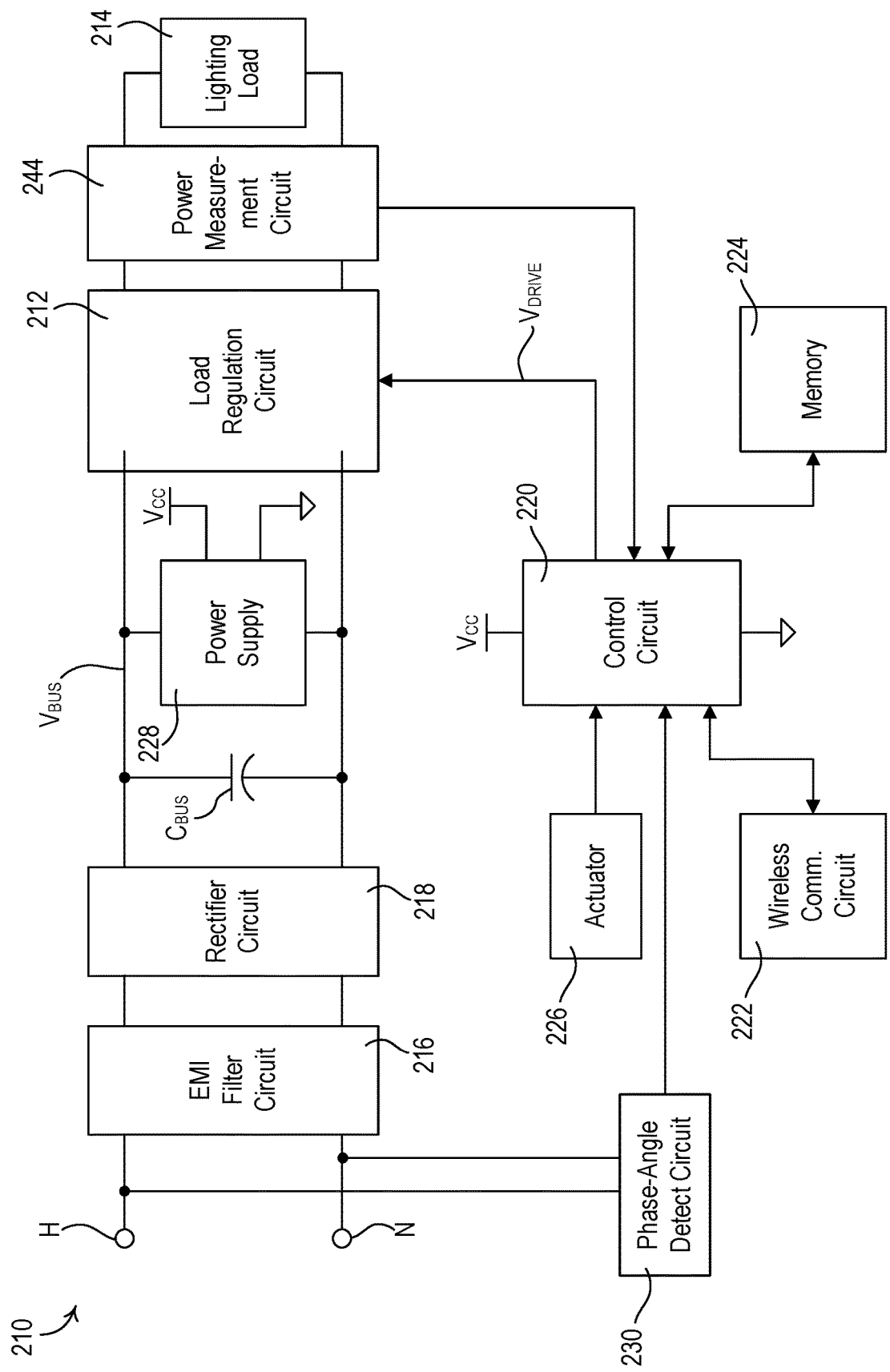
FIG. 2 is a simplified block diagram of an example smart lighting device that may be deployed in the load control system illustrated in FIG. 1.

A communicating device (e.g., a communicating lighting device and/or a communicating load control device) may be capable of performing digital communications (e.g., wireless digital communications). A non-communicating device (e.g., a non-communicating lighting device and/or a non-communicating load control device) may be incapable of performing digital communications (e.g., wireless digital communications). A communicating lighting device (e.g., a wireless controllable lighting device) may be capable of transmitting and/or receiving control instructions in digital messages and controlling a lighting load based on the control instructions. A non-communicating lighting device may be incapable of transmitting and/or receiving control instructions in digital messages. A communicating load control device may be capable of transmitting and/or receiving control instructions in digital messages. A non-communicating load control device may be incapable of transmitting and/or receiving control instructions in digital messages. A communicating lighting device may be referred to as a communicating bulb and a communicating load control device may be referred to as a communicating dimmer. A non-communicating lighting device may be referred to as a non-communicating bulb and a non-communicating load control device may be referred to as a non-communicating dimmer. Smart bulbs, smart lighting devices, smart dimmers, and smart load control devices may be examples of communicating devices, as described herein. Smart bulbs and smart lighting devices may be examples of communicating lighting devices. Smart dimmers and smart load control devices may be examples of communicating load control devices. Non-smart bulbs, non-smart lighting devices, non-smart dimmers, and non-smart load control devices may be examples of non-communicating devices, as described herein. Non-smart bulbs and non-smart lighting devices may be examples of non-communicating lighting devices. Non-smart dimmers and non-smart load control devices may be examples of non-communicating load control devices.

FIGS. 1A-1C are simplified block diagrams of example load control systems. FIG. 1A depicts an example of a lighting control system having at least one non-smart lighting device (e.g., non-smart bulbs 110) and at least one smart lighting device (e.g., smart bulbs 120a, 120b). As shown, the non-smart bulb 110 and the smart bulb 120a may be installed in respective ceiling-mounted downlight fixtures 112 and the smart bulb 120b may be installed in a tabletop lighting fixture 114, such as a lamp (e.g., table lamp). The non-smart and smart bulbs 110, 120a, 120b shown in FIG. 1A may include light sources of different types (e.g., incandescent lamps, fluorescent lamps, and/or LED light sources).

The non-smart bulb 110 may be incapable of transmitting and/or receiving wireless communications. The smart bulbs 120a, 120b may be capable of transmitting and/or receiving wireless communications. For example, the smart bulbs 120a, 120b may each include a wireless communication circuit (e.g., a radio frequency (RF) transceiver) operable to transmit and/or receive wireless signals such as RF signals 106. One or more of the smart bulbs 120a, 120b may have advanced features. For example, one or more of the smart bulbs 120a, 120b may be controlled to emit light of varying intensities and/or colors in response to control instructions received in messages (e.g., digital messages) from another control device.

The load control system may comprise a load control device, such as a dimmer 130 (e.g., a non-smart dimmer), that is electrically coupled in series between an alternating-current (AC) power source 102 and the non-smart and smart bulbs 110, 120a, such that the non-smart bulb 110 and the smart bulb 120a may receive power from the AC power source 102 via the dimmer 130. The tabletop lighting fixture 114 may be plugged into an electrical receptacle 116 that is electrically coupled to the AC power source 102, such that the smart bulb 120b may receive power from the AC power source 102. Though the non-smart bulb 110 and the smart bulbs 120a, 120b are shown in FIG. 1A, any number of non-smart and smart bulbs may be supported in the lighting control system 100.

The lighting control system 100 may include one or more control devices for controlling the non-smart and smart bulbs 110, 120a, 120b (e.g., controlling an amount of power delivered to the light sources of the bulbs). The non-smart and smart bulbs 110, 120a, 120b may be controlled substantially in unison, or be controlled individually. For example, the bulbs may be zoned so that the non-smart bulb 110 and the smart bulb 120a may be controlled by a first control device, while the smart bulb 120b may be controlled by a second control device. The control devices may be configured to turn the non-smart and smart bulbs 110, 120a, 120b on and off. The control devices may be configured to control an intensity level of each of the non-smart and smart bulbs 110, 120a, 120b between a low-end intensity level $L_{LE}$ and a high-end intensity level $L_{HE}$, for example. The control devices may be configured to control a color (e.g., a color temperature) of light emitted by the smart bulbs 120a, 120b.

The dimmer 130 may be configured as a wall-mounted load control device (e.g., as shown in FIG. 1A). The dimmer 130 may be a non-smart load control device. The dimmer 130 may be configured to be mounted to a standard electrical wall box (e.g., via a yoke) and be coupled in series electrical connection between the AC) power source 102 and the non-smart bulb 110 and the smart bulb 120a. The dimmer 130 may receive an AC mains line voltage from the AC power source 102, and may generate a phase-control signal for controlling the non-smart bulb 110 and the smart bulb 120a. The phase-control signal may be a phase-cut AC waveform. The dimmer 130 may include a knob 132 (e.g., a rotary knob) that may be rotated to adjust the intensity levels of the non-smart bulb 110 and/or the smart bulb 120a. In addition, the knob may be pushed in to toggle (e.g., turn on and off) the non-smart bulb 110 and/or the smart bulb 120a. For example, rotations of the knob 132 may adjust a phase angle of the phase-control signal. The phase-control implemented by the phase-control signal may comprise forward phase control, reverse phase control, center phase control, notch phase control, and/or multi-phase control. The phase-control signal may be generated via various phase-control techniques (e.g., a forward phase-control dimming technique or a reverse phase-control dimming technique). Examples of wall-mounted dimmers are described in greater detail in commonly-assigned U.S. Pat. No. 8,664,881, issued Mar. 4, 2014, entitled TWO-WIRE DIMMER SWITCH FOR LOW-POWER LOADS, the entire disclosure of which is hereby incorporated by reference.

The load control system 100 may also include a system controller 150. The system controller 150 may be configured to transmit and/or receive communication signals (e.g., the RF signals 106). The system controller 150 may be configured to transmit messages (e.g., digital messages) to the smart bulbs 120a, 120b for controlling the smart bulbs 120a, 120b. The system controller 150 may communicate via one or more types of RF communication signals, such as RF signals 106 (e.g., using a wireless protocol, such as ZIGBEE, THREAD, NFC, BLUETOOTH, BLUETOOTH LOW ENERGY (BLE), WI-FI, CLEAR CONNECT, CLEAR CONNECT TYPE X protocols). The system controller 150 may be connected to a network 152, e.g., via a wired or wireless communication link. The system controller 150 may be configured to communicate messages with a network device 160 (e.g., a mobile device, such as a smart phone or a tablet) via RF signals 108 transmitting through the network 152. The system controller 150 may be configured to receive messages including commands for controlling the smart bulbs 120a, 120b from the network device 160 via the network 152 and/or transmit messages via the network 152 for providing data (e.g., status information) to the network device 160 and/or other external devices.

A user may install a smart lighting device (e.g., such as the smart bulb 120a) on a circuit 103 (e.g., a controlled circuit and/or a dimmed-hot circuit) that is controlled by a non-smart load control device (e.g., the dimmer 130). The smart lighting device (e.g., the smart bulb 120a) may be controlled by the same load control device (e.g., the dimmer 130) as one or more non-smart lighting devices (e.g., the non-smart bulb 110). As such, the smart lighting device (e.g., the smart bulb 120a) may include one or more features that are not available when controlled by the non-smart load control device (e.g., the dimmer 130). For example, advanced features, such as full-range dimming, adjustable dimming control (e.g., use of multiple and/or adjustable dimming control curves), color control, and/or other advanced features, may not be available when the smart lighting device (e.g., the smart bulb 120a) is controlled by the non-smart load control device (e.g., the dimmer 130). The intensity level of the smart lighting device (e.g., smart bulb 120a) and the non-smart lighting devices (e.g., the non-smart bulb 110) may be similarly controlled by the phase-control signal received from the dimmer 130.

A smart lighting device (e.g., such as the smart bulb 120a) may be configured to provide feedback to the user when installed on the circuit 103 controlled by the non-smart load control device. For example, the smart bulb 120a may be added to the circuit 103 controlled by the dimmer 130. The smart bulb 120a may have replaced a non-smart lighting device (e.g., a non-smart bulb). The smart bulb 120a may determine that a phase-control signal is being received from the dimmer 130. When the smart bulb 120a determines that the phase-control signal is being received, the smart bulb 120a may control its light source based on the phase-control signal. In some embodiments, when the smart bulb 120a determines that the phase-control signal is being received, the smart bulb 120a may determine not to adjust its light source based on messages received via the RF signals 106 (e.g., and not provide advanced features).

When the smart bulb 120a determines that a phase-control signal is being received, the smart bulb 120a may transmit a message indicating that the smart bulb 120a is receiving the phase-control signal. The message may include feedback to be provided to a user. The message may be received by the network device 160 directly or via the system controller 150. The message may be received by the network device 160 for displaying a warning to a user. The warning may include an indication that the smart bulb 120a is receiving a phase-control signal. In addition, the warning message may include an indication that if the smart bulb 120a is not capable of being powered by a phase-control signal, the smart bulb 120a should be replaced with a non-smart bulb and/or a smart bulb that is capable of being powered by a phase-control signal. Further, the warning message may include an indication that the smart bulb 120a is being controlled in response to the phase-control signal and not the RF signals 106, and that the advanced features may be unavailable for control on the smart bulb 120a due to the limited control available. The warning may indicate that the non-smart load control device (e.g., the dimmer 130) should be replaced with a smart load control device (e.g., a smart dimmer).

Alternatively or additionally, when the smart bulb 120a determines that the phase-control signal is being received, the smart bulb 120a may provide feedback to the user, for example, via a visual indication. The smart bulb 120a may change a state of its light source to provide the feedback to the user. For example, the smart lighting device 120a may flash its light source and/or adjust a color (e.g., color temperature) of light emitted by its light source. In examples, the smart bulb 120a may shine (e.g., blink) red to provide the feedback to the user. The feedback may indicate that the smart bulb 120a is receiving a phase-control signal. In addition, the feedback may indicate that the smart bulb 120a should be replaced with a non-smart bulb and/or a smart bulb that is capable of being powered by a phase-control signal. Further, the warning message may indicate that the advanced features may be unavailable for control on the smart bulb 120a due to the limited control available. The feedback may indicate to the user that the dimmer 130 should be replaced (e.g., with a smart load control device).

FIG. 1B depicts another example of the lighting control system 100, where the lighting control system 100 has a smart control device (e.g., a smart dimmer 140) and a plurality of smart lighting devices (e.g., smart bulbs 120a, 120b, 120c) installed on a circuit 104 (e.g., a controlled circuit and/or a dimmed-hot circuit). As shown, the smart bulbs 120a, 120c may be installed in the respective ceiling-mounted downlight fixtures 112 and the smart bulb 120b may be installed in the tabletop lighting fixture 114 (e.g., the table lamp). The smart bulbs 120a, 120b, 120c shown in FIG. 1B may include light sources of different types (e.g., incandescent lamps, fluorescent lamps, and/or LED light sources).

The smart bulbs 120a, 120b, 120c may be capable of transmitting and/or receiving wireless communications. For example, the smart bulbs 120a, 120b, 120c may each include a wireless communication circuit (e.g., a radio frequency (RF) transceiver) operable to transmit and/or receive the RF signals 106. One or more of the smart bulbs 120a, 120b, 120c may have advanced features. For example, one or more of the smart bulbs 120a, 120b, 120c may be controlled to emit light of varying intensities and/or colors in response to control instructions received in messages from another control device.

The smart dimmer 140 may be electrically coupled in series between the AC power source 102 and the smart bulbs 120a, such that the smart bulbs 120a, 120c may receive power from the AC power source 102 via the smart dimmer 140. Since all of the bulbs coupled to the smart dimmer 140 are smart bulbs (e.g., the smart bulbs 120a, 120c), the circuit 104 including the smart bulbs 120a, 120c may be considered a non-mixed circuit (e.g., a circuit with no non-smart bulbs). Though three smart bulbs 120a, 120b, 120c are shown in FIG. 1B, any number of smart bulbs may be included in the lighting control system 100.

The lighting control system 100 may include one or more control devices for controlling the smart bulbs 120a, 120b, 120c (e.g., controlling an amount of power delivered to the light sources of the bulbs). The smart bulbs 120a, 120b, 120c may be controlled substantially in unison, or may be controlled individually. For example, the smart bulbs 120a, 120b, 120c may be zoned so that the smart bulbs 120a, 120c may be controlled by a first control device, while the smart bulb 120b may be controlled by a second control device. The control devices may be configured to turn the smart bulbs 120a, 120b, 120c on and off. The control devices may be configured to control the smart bulbs 120a, 120b, 120c so as to control an intensity level of each of the smart bulbs 120a, 120b, 120c between a low-end intensity level $L_{LE}$ and a high-end intensity level $L_{HE}$, for example. Controlling the intensity levels of the smart bulbs 120a, 120b, 120c may adjust the intensity levels of light emitted by the respective light sources of the smart bulbs 120a, 120b, 120c. The control devices may be configured to control a color (e.g., a color temperature) of light emitted by each of the smart bulbs 120a, 120b, 120c.

The smart dimmer 140 may be configured to be responsive to a user input and generate control instructions (e.g., a wired and/or wireless control signal) for controlling the smart bulbs 120a, 120b, 120c based on the user input. The control instructions may include commands and/or other information (e.g., such as identification information) for controlling the smart bulbs 120a, 120b, 120c. The smart dimmer 140 may be configured as a wall-mounted load control device (e.g., as shown in FIG. 1B). The smart dimmer 140 may be configured to be mounted to a standard electrical wall box (e.g., via a yoke) and be coupled in series electrical connection between the AC power source 102 and the smart bulbs 120a, 120c). The smart dimmer 140 may receive an AC mains line voltage from the AC power source 102, and may generate a phase-control signal for controlling the smart bulbs 120a, 120c.

The smart dimmer 140 may include a toggle actuator 142, a level-adjustment actuator 144, and/or a plurality of visible indicators 146. The smart dimmer 140 may turn the smart bulbs 120a, 120c on and off in response to actuations of the toggle actuator 142, and/or adjust the intensity level of the smart bulbs 120a, 120c in response to actuations of the level-adjustment actuator 144. For example, the smart dimmer 140 may adjust a phase-angle of the phase-control signal to adjust the intensity level of the smart bulbs 120a, 120c in response to actuation of the level-adjustment actuator 144. The smart dimmer 140 may generate the phase-control signal via various phase-control techniques (e.g., a forward phase-control dimming technique, a reverse phase-control dimming technique, a center phase-control technique, a notch phase-control technique, and/or a multi-phase-control technique). The plurality of lighting indicators 146 may include one or more internal light sources (e.g., LEDs) configured to be illuminated to provide feedback to a user of the smart dimmer 140. Such feedback may indicate, for example, a status of the smart bulbs 120A, 120C, such as whether the light sources of the smart bulbs 120a, 120c are on or off, a present intensity of the smart bulbs 120A, 120C, and so on. The feedback may indicate a status of the smart dimmer 140 itself such as a power status of the smart dimmer 140.

The smart dimmer 140 may be configured to transmit messages via the RF signals 106 for controlling the smart bulbs 120a, 120b, 120c. The smart dimmer 140 may include a wireless communication circuit that is configured to transmit and/or receive wireless signals such as RF signals 106. For example, the smart dimmer 140 may be configured to transmit messages to load control devices (e.g., the smart bulbs 120a, 120b, 120c) that are within a wireless communication range of the smart dimmer 140 via the RF signals 106.

A smart lighting device may determine how it should be controlled by a smart load control device. Additionally or alternatively, the smart load control device may determine how to control the smart lighting device. For example, a user may install one or more smart lighting devices (e.g., the smart bulbs 120a, 120c) on the circuit 104 controlled by a smart load control device (e.g., the smart dimmer 140). The smart bulbs 120a, 120c may initially respond to the phase-control signal and switch to wireless control in response to receiving a message from the smart dimmer 140 via wireless signals (e.g., the RF signals 106). For example, the smart bulbs 120a, 120c may be configured to recognize whether they are electrically connected to the same circuit 104 as the smart dimmer 140. The smart bulbs 120a, 120c may determine that they are electrically connected to the same circuit 104 as the smart dimmer 140 based on receipt of a message that includes control instructions and/or an identifier associated with the smart dimmer 140. The smart bulbs 120a, 120c may be initially configured to respond to the phase-control signal from the smart dimmer 140. Upon receipt of a message) from the smart dimmer 140 (e.g., via the wireless signals), the smart bulbs 120a, 120c may switch to wireless control. For example, the smart bulbs 120a, 120c may determine to ignore the phase-control signal from the smart dimmer 140 while responding to messages received via the wireless signals.

The smart dimmer 140 may receive a message from the smart bulbs 120a, 120c and/or from the system controller 150 indicating that the smart bulbs 120a, 120c are responsive to control instructions transmitted in messages via the wireless signals. For example, each of the smart bulbs 120a, 120c may transmit a message to the smart dimmer 140 indicating that it is responsive to control instructions transmitted in messages via the wireless signals. Alternatively or additionally, the system controller 150 may transmit the message to the smart dimmer 140 indicating that each (e.g., all) of the smart bulbs (e.g., smart bulbs 120a, 120c) on the circuit 104 controlled by the smart dimmer 140 are responsive to control instructions transmitted in messages via the wireless signals. In another example, the smart dimmer 140 may measure a magnitude of a load current conducted through the circuit 104 to determine how many smart bulbs and/or non-smart bulbs are on the circuit 104. The smart dimmer 140 may then determine whether it has received messages from the same number of smart bulbs.

The smart dimmer 140 may determine that the smart bulbs 120a, 120c (e.g., each smart bulb on its circuit 104 as shown in FIG. 1B) are smart bulbs and may transition to a maintained conduction mode. For example, the smart dimmer 140 may operate at a maintained conduction mode when the smart bulbs 120a, 120c are on. The maintained conduction mode may comprise a high phase-control angle that is greater than a predefined threshold. For example, when in the maintained conduction mode, the smart dimmer 140 may adjust the amount of power delivered to the smart bulbs 120a, 120c to be greater than the predefined threshold (e.g., when the smart bulbs 120a, 120c are on). For example, the predefined threshold associated with the maintained conduction mode may be 70% of a maximum power level or greater. The maintained conduction mode may ensure that the smart bulbs 120a, 120c have enough power to achieve a full range of dimming intensities. For example, when in the maintained conduction mode, the firing angle of the phase-control signal may be maintained at a relatively stable level (e.g., instead of being adjusted per typical phase control dimming). A full-conduction mode may be an example of a maintained conduction mode where the predefined threshold is set at the maximum power level. The full-conduction mode may enable the smart bulbs 120a, 120c to receive a maximum amount of power from the smart dimmer 140 for being able to control in the respective light sources in response to the messages. When in the full-conduction mode, the smart dimmer 140 may stay at a high-end trim setting (e.g., a maximum amount of power that can be provided to the smart bulbs 120a, 120c electrically connected to the circuit 104). For example, the smart dimmer 140 may stop adjusting the phase angle of the phase-control signal and may set the phase angle of the phase-control signal to a maximum phase angle (e.g., a maximum phase-angle that may be provided to the smart bulbs while still allowing a power supply of the smart dimmer 140 charge) when in the full-conduction mode. The smart dimmer 140 may control the smart bulbs 120a, 120c by transmitting control instructions in messages via the wireless signals when in the full-conduction mode. The smart dimmer 140 may turn the smart bulbs 120a, 120c on and off by transmitting control instructions in messages to the smart bulbs 120a, 120c, where the control instructions include commands for turning the smart bulbs 120a, 120c on and off. The smart dimmer 140 may adjust the intensity of light emitted by the smart bulbs 120a, 120c by transmitting the control instructions in messages to the smart bulbs 120a, 120c. The smart dimmer 140 may adjust one or more other parameters (e.g., such as color temperature) of the smart bulbs 120a, 120c by transmitting the control instructions in messages to the smart bulbs 120a, 120c. In addition, the smart dimmer 140 may turn the smart bulbs 120a, 120c on and off (e.g., in unison) by applying and removing power, respectively, to the smart bulbs 120a, 120c.

In addition to performing control of smart bulbs 120a, 120b, 120c as described herein, the smart dimmer 140 and/or smart bulbs 120a, 120b, 120c may be configured (e.g., automatically configured) for operation in the load control system 100. For example, the smart dimmer 140, the smart bulbs 120a, 120b, 120c, and/or the system controller 150 may be configured for operation in a non-mixed circuit (e.g., a circuit with no non-smart bulbs).

The smart dimmer 140 may be configured to determine that a new smart bulb (e.g., such as one of the smart bulbs 120a, 120c) has been added to its circuit 104. The smart dimmer 140 may detect a change in a load current conducted through the circuit 104. The smart dimmer 140 may transmit a discovery message in response to detecting the change in the load current. The discovery message may initiate discovery of an added smart bulb. For example, the added smart bulb may respond to the discovery message by transmitting a response message. The smart dimmer 140 may determine that the response message has been received from the added smart bulb.

In another example, a newly-added smart bulb may transmit (e.g., via a multicast or broadcast message) a power-up message upon receiving power (e.g., upon being connected to the AC power source 102 and beginning to receive AC mains voltage). Upon receiving the power-up message from the added smart bulb, the smart dimmer 140 may determine if the smart bulb is on the circuit 104 of the smart dimmer, for example, by transmitting a discovery signal on the circuit 104. For example, the smart dimmer 140 may slightly adjust (e.g., wiggle) the phase angle of the phase-control signal to transmit the discovery signal on the circuit 104. The added smart bulb may transmit a response message (e.g., via the RF signals 106) upon detection of the slightly-adjusted (e.g., wiggled) phase angle.

The smart dimmer 140 may be configured to associate itself (e.g., automatically associate itself) with the added smart bulb (e.g., such as one of the smart bulbs 120a, 120c). For example, the smart dimmer 140 may associate with the added smart bulb in response to receipt of the response message from the smart bulb. To associate itself with the added smart bulb, the smart dimmer 140 may store a unique identifier of the added smart bulb in memory, for example, for being able to transmit messages to the added smart bulb. The smart dimmer 140 may alto transmit its unique identifier to the newly-added smart bulb.

The smart dimmer 140 may be configured to program (e.g., automatically program) the added smart bulb (e.g., such as one of the smart bulbs 120a, 120c). The smart dimmer 140 may program the added smart bulb to function similar to a previously installed smart bulb and/or another bulb electrically connected to the circuit 104 controlled by the smart dimmer 140. The smart dimmer 140 may transmit a configuration message to the added smart bulb, for example, in response to being associated with the added smart bulb. The configuration message may include the one or more configuration settings. The one or more configuration settings may include an address, a high-end trim, a low-end trim, a preset intensity level, a preset color, and/or a fade rate. The configuration message may also include one or more control features (e.g., operational parameters). The one or more control features may include an elongation of a dimming control curve below a pre-determined intensity threshold and/or color control of the light emitted by the light source of the added smart bulb.

FIG. 1C depicts another example of the lighting control system 100, where the lighting control system 100 has a smart control device (e.g., the smart dimmer 140), a plurality of smart lighting devices (e.g., the smart bulbs 120a, 120b), and at least one non-smart lighting device (e.g., the non-smart bulb 110). As shown, the non-smart bulb 110 and the smart bulb 120a may be installed in respective ceiling-mounted downlight fixtures 112 and the smart bulb 120b may be installed in the tabletop lighting fixture 114 (e.g., the table lamp). The non-smart and smart bulbs 110, 120a, 120b shown in FIG. 1C may include light sources of different types (e.g., incandescent lamps, fluorescent lamps, and/or LED light sources).

The load control system 100 may include a sensor 134 (e.g., a wireless sensor). For example, the sensor 134 may measure a total light intensity in the space around the sensor 134 (e.g., may operate as an ambient light sensor and/or a daylight sensor). The sensor 134 may transmit messages including the measured light level via the RF signals 106 to the smart bulbs 120a, 120b and/or the smart dimmer 140. The smart bulbs 120a, 120b and/or the smart dimmer 140 may be configured to control the smart bulbs 120a, 120b and/or the non-smart bulbs 110 in response to the measured light level. Examples of RF load control systems having daylight sensors are described in greater detail in commonly assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY POWERED DAYLIGHT SENSOR, the entire disclosures of which are hereby incorporated by reference. It should be appreciated that the smart bulbs 120a, 120b and/or the smart dimmer 140 may include a sensor (not shown) that operates as an ambient light sensor and/or a daylight sensor. The sensor 134 may also be a visible light sensor (e.g., including a camera) capable of detecting an amount of ambient light within a space occupied by the smart bulbs 120a, 120b and/or the smart dimmer 140.

The non-smart bulb 110 may be incapable of transmitting and/or receiving wireless communications. The smart bulbs 120a, 120b may be smart bulbs capable of transmitting and/or receiving wireless communications. For example, the smart bulbs 120a, 120b may each include a wireless communication circuit (e.g., a radio frequency (RF) transceiver) operable to transmit and/or receive wireless signals such as RF signals 106. One or more of the smart bulbs 120a, 120b may have advanced features. For example, one or more of the smart bulbs 120a, 120b may be controlled to emit light of varying intensities and/or colors in response to control instructions received in messages from another control device.

The smart bulb 120a may be configured to determine whether to respond to phase-control or digital control messages (e.g., from the smart dimmer 140). For example, the smart bulb 120a may determine that the smart dimmer 140 is generating a phase-control signal (e.g., phase-control signals). The smart bulb 120a may receive a configuration message from the smart dimmer 140. In response to receiving the configuration message, the smart bulb 120a may determine to control an amount of power delivered to its light source in accordance with control messages (e.g., wireless control messages) received from the smart dimmer 140.

The smart dimmer 140 may be electrically coupled in series between the AC power source 102 and the non-smart and smart bulbs 110, 120a, such that the non-smart bulb 110 and the smart bulb 120a may receive power from the AC power source 102 via the smart dimmer 140. Though the non-smart bulb 110 and smart bulbs 120a, 120b are shown in FIG. 1C, any number of non-smart and smart bulbs may be included in the lighting control system 100.

The smart dimmer 140 may be configured to control non-smart and smart bulbs on the circuit 105 and one or more smart bulbs not on circuit 105. For example, the smart dimmer 140 may be configured to be responsive to a user input to control the non-smart bulb 110 and the smart bulb 120a on circuit 105. The smart dimmer 140 may also be configured to be responsive to the user input to control the smart bulb 120b that is not on circuit 105. For example, the smart dimmer 140 may use phase-control to control an intensity of light emitted by the non-smart bulb 110 and the smart bulb 120a on circuit 105 and use wireless control to control an intensity of light emitted by the smart bulb 120b.

When a user installs both a smart lighting device (e.g., the smart bulb 120a) and a non-smart lighting device (e.g., the non-smart bulb 110) in a circuit 105 (e.g., a controlled circuit and/or a dimmed-hot circuit) controlled by a smart load control device (e.g., the smart dimmer 140), the smart lighting device (e.g., the smart bulb 120a) and/or the smart load control device (e.g., the smart dimmer 140) may be configured to determine that the circuit 105 is a mixed circuit (e.g., including both smart lighting devices and non-smart lighting devices).

The smart dimmer 140 may determine that the circuit 105 with the non-smart bulb 110 and the smart bulb 120a is a mixed circuit by identifying how the bulbs on the circuit 105 respond to changes in the phase-control signal and/or control instructions in messages. For example, the smart dimmer 140 may determine whether the circuit 105 is a mixed circuit by turning off the smart bulbs in the circuit 105 via control instructions in messages and measuring the light level in the area. The smart dimmer 140 may use the sensor 134 to measure the light level in the area. For example, after the smart bulb 120a is turned off, the smart dimmer 140 may receive a message from the sensor 134 (e.g., in response to a query or transmitted automatically from the sensor 134) that indicates a light level in space. The smart dimmer 140 may determine whether the circuit 105 is a mixed circuit at night. The smart dimmer 140 may be configured to turn off other smart bulbs and/or other smart dimmers in the vicinity of the smart dimmer when attempting to determine if the circuit is a mixed circuit. The smart dimmer 140 may determine that the circuit 105 is a mixed circuit in response to determining that at least one non-smart bulb (e.g., the non-smart bulb 110) is still on and emitting light after all of the smart bulbs in the circuit 105 (e.g., the smart bulb 120a) are off. For example, when the measured light is above a pre-determined threshold, the smart dimmer 140 may determine that the circuit 105 is a mixed circuit (e.g., because one or more non-smart bulbs is still on).

Alternatively or additionally, the smart dimmer 140 may determine whether the circuit 105 is a mixed circuit based on whether a message has been received by an added bulb. For example, the smart dimmer 140 may determine that a bulb (e.g., the non-smart bulb 110 and/or the smart bulb 120a) has been added to the circuit 105 and may determine whether the added bulb has responded to a message sent by the smart dimmer 140. The smart dimmer 140 may determine whether the circuit 105 is a mixed circuit based on whether the added bulb responds to the message. If the circuit 105 has all smart bulbs and the added bulb does not respond to the message, the circuit 105 may be a mixed circuit. The smart dimmer 140 may determine whether the circuit 105 remains a mixed circuit, remains a non-mixed circuit, changes from a mixed circuit to non-mixed circuit, or changes from a non-mixed circuit to a mixed circuit when the bulb replaces another bulb based on whether the bulb responds to the message. The smart dimmer 140 may determine whether the circuit 105 remains a mixed circuit, remains a non-mixed circuit, changes from a mixed circuit to non-mixed circuit, or changes from a non-mixed circuit to a mixed circuit when the bulb is added to the circuit based on whether the bulb responds to the message.

When the circuit 105 is a mixed circuit, the smart bulb 120a may decide to respond to a phase-control signal and ignore wireless signals. For example, the smart dimmer 140 may transmit a message to the smart bulb 120a indicating that the smart bulb 120a should respond to the phase-control signal (e.g., and ignore control instructions in wireless signals from the smart dimmer 140 that indicate to adjust an intensity of the light emitted by the smart bulb 120a). When the circuit 105 is a mixed circuit, the smart dimmer 140 may adjust the phase-control signal in accordance with control instructions in messages received via wireless signals from another control device (e.g., such as the system controller 150 and/or the network device 160).

When the smart dimmer 140 determines that the circuit 105 is a mixed circuit, the smart dimmer 140 may go to a maintained conduction mode. When in the maintained conduction mode, the smart dimmer 140 may be configured to turn on and off all of the bulbs on the mixed circuit (e.g., the non-smart bulb 110 and the smart bulb 120a) by controlling the power delivered to the bulbs through the circuit 105. When in the maintained conduction mode, the smart dimmer 140 may also be configured to adjust the intensity level of the smart bulb 120a (e.g., only the smart bulb 120a) on the mixed circuit using control instructions in wireless signals. The maintained conduction mode may enable the non-smart bulb 110 and the smart bulb 120a to receive a maximum amount of power from the smart dimmer 140. The smart bulb 120a may be able to respond to wireless signals while the smart dimmer 140 is in the maintained conduction mode. When in the maintained conduction mode, the smart dimmer 140 may stay at a high-end trim setting (e.g., a maximum amount of power that can be provided to the non-smart bulb 110 and the smart bulb 120a electrically connected to the circuit 105). For example, the smart dimmer 140 may stop adjusting the phase angle of the phase-control signal and may set the phase angle of the phase-control signal to a maximum phase angle when in the maintained conduction mode. Allowing the smart bulb 120a to respond to messages while receiving the maximum amount of power from the smart dimmer 140 may allow the smart bulb 120a to provide advanced features. The non-smart bulb 110 may be limited to turning on or off when the smart dimmer 140 is in the maintained conduction mode. For example, the maintained conduction mode may enable the smart lighting devices on the mixed circuit (e.g., the smart bulb 120a) to have full dimming capability. When the smart dimmer 140 is not in the maintained conduction mode, the phase-control signal may cause the dimming range of the smart bulb 120a to be reduced and/or may prevent the smart bulb 120a from having full dimming capability. In this example embodiment, non-smart bulb 110 may fail to respond to actuations of the level-adjustment actuator 144 on the smart dimmer 140, while smart bulb 120a may be fully enabled to provide the configured features (e.g., dimming ranges, color temperature ranges, color spectrum, and/or other features).

When the smart dimmer 140 determines that the circuit 105 is a mixed circuit, the smart dimmer 140 may enter a non-dim mode. When in the non-dim mode, the smart dimmer 140 may only turn the smart bulb 120a and non-smart bulb 110 on and off without performing dimming control. For example, the smart dimmer 140 may operate at a maintained conduction mode when the smart bulb 120a and the non-smart bulb 110 are on. The maintained conduction mode may comprise a high phase-control angle that is greater than a predefined threshold. For example, when in the maintained conduction mode, the smart dimmer 140 may adjust the amount of power delivered to the smart bulb 120a and non-smart bulb 110 to be greater than the predefined threshold (e.g., when the smart bulb 120a and non-smart bulb 110 are on). For example, the predefined threshold associated with the maintained conduction mode may be 70% of a maximum power level or greater. The maintained conduction mode may ensure that the smart bulb 120a has enough power to achieve a full range of dimming intensities. For example, when in the maintained conduction mode, the firing angle of the phase-control signal may be maintained at a relatively stable level (e.g., instead of being adjusted per typical phase control dimming). Full conduction mode may be an example maintained conduction mode, for example, where the predefined threshold is set at the maximum power level. With a mixed circuit, the non-dim mode may prevent the smart bulb 120a and non-smart bulb 110 in the mixed circuit from having different appearances (e.g., emitting light of varying intensities and/or color in response to different control from the phase-control signal and control instructions in messages). The non-dim mode may also allow for similar control of the smart bulbs and the non-smart bulbs in response to actuations of the actuators of the smart dimmer 140. The non-dim mode may be similar to the maintained conduction mode, but without the smart dimmer 140 transmitting messages including control instructions to the smart bulb 120.

The smart dimmer 140 may determine how to control smart bulbs based on whether the circuit 105 is a mixed circuit. For example, the smart dimmer 140 may send a phase-control signal to adjust the amount of power delivered to the one or more lighting devices (e.g., the smart bulb 120a and the non-smart bulb 110). The smart dimmer 140 may determine whether circuit 105 is a mixed circuit. When the smart dimmer 140 determines that the circuit 105 is a mixed circuit, the smart dimmer 140 may adjust a phase angle of the phase-control signal to adjust an intensity of light emitted by the smart bulb 120A and the non-smart bulb 110. When the smart dimmer 140 determines that the circuit 105 is a mixed circuit, the smart dimmer 140 may send control messages (e.g., digital control messages) to adjust one or more other parameters (e.g., other than intensity) of the smart bulb 120a. For example, the one or more other parameters may comprise a color and/or a color temperature of the smart bulb 120a. When the smart dimmer 140 controls the intensity of the non-smart bulbs and the smart bulbs using the phase-control signal and uses control messages to adjust one or more other parameters of the smart bulbs, the full capability of each bulb on the circuit 105 may be achieved. For example, a user actuation of the smart dimmer 140 may be used to control both the smart bulb 120a (e.g., using the phase-control signal and control instructions in messages) and the non-smart bulb 110 (e.g., using the phase-control signal).

Additionally or alternatively, the smart dimmer 140 may be configured to control non-smart bulbs and smart bulbs simultaneously. For example, when the smart dimmer 140 determines that the circuit 105 is a mixed circuit, the smart dimmer 140 may adjust a phase angle of a phase-control signal and transmit wireless signals including control instructions (e.g., at the same time) in response to user actuation of the smart dimmer 140 (e.g., the toggle actuator 142 and/or the level-adjustment actuator 144). In this case, the non-smart lighting device(s) (e.g., the non-smart bulb 110) may respond to the phase-control signal and the smart lighting device(s) (e.g., the smart bulb 120a) may respond to the control instructions in the messages. When the smart dimmer 140 controls the non-smart bulbs and the smart bulbs simultaneously, the full capability of each bulb on the circuit 105 may be achieved. For example, a user actuation of the smart dimmer 140 may be used to control both the smart bulb 120a (e.g., using control instruction in messages) and the non-smart bulb 110 (e.g., using a phase-control signal).

The smart dimmer 140 may adjust a dimming range of the smart bulbs (e.g., the smart bulb 120a) on the mixed circuit to correspond to a dimming range of the non-smart bulbs (e.g., the smart bulb 110). The smart dimmer 140 may have the dimming range of the non-smart bulbs stored in memory. For example, the smart dimmer 140 may be configured to determine (e.g., receive) the dimming ranges of one or more non-smart bulbs on the market from the system controller 140, and store the dimming range for the non-smart bulbs that are coupled to the mixed circuit in memory. The smart dimmer 140 may receive the dimming ranges via system configuration information from another device in the system. For example, the smart dimmer 140 may receive the dimming ranges in system configuration information from the system controller 150 and/or the network device 160. The dimming ranges may be based on a model number of one or more non-smart bulbs. A user may enter the model number, scan or enter a universal product code (UPC), or enter another identifier from which the dimming ranges may be determined into the network device 160. The network device 160 may perform a lookup of the dimming ranges of the non-smart bulbs based on the identifiers or transmit the identifier to the system controller 150 for performing the lookup. The lookup may be performed in a database that is generated using system configuration software that has the corresponding identifiers of the non-smart bulbs on the market with the dimming ranges of the non-smart bulbs. The dimming ranges may be transmitted to the smart dimmer 140 and/or the smart bulbs for enabling the smart bulbs to be controlled via similar corresponding dimming ranges than the non-smart bulbs. Additionally or alternatively, the smart dimmer 140 may be configured to determine the dimming range of the non-smart lighting device(s) (e.g., via information received from the sensor 134). For example, the smart dimmer 140 may be configured to control the non-smart bulb 110 to the high-end intensity level $L_{HE}$ and then the low-end intensity level $L_{LE}$. The sensor 134 may be configured to measure the light levels at the high-end intensity level $L_{HE}$ and the low-end intensity level $L_{LE}$ and transmit the measured light levels to the smart dimmer 140 for determining the dimming range of the non-smart bulb 110. After determining the dimming range of the non-smart bulbs, the smart dimmer 140 may only transmit to the smart bulbs via the wireless signals control instructions that include intensity levels that corresponds to the dimming range of the non-smart bulbs being controlled by the phase-control signal. The smart bulbs may each be configured to respond to the phase-control signal (e.g., revert back to responding to the phase-control signal), for example, if the smart bulb stops receiving messages from the smart dimmer 140. For example, when the smart bulbs fail to receive messages from the smart dimmer 140 for a predefined period of time, the smart bulbs may perform control in response to the phase-control signal. Additionally, or alternatively, the smart bulbs may revert back to responding to the phase-control signal in response to a message (e.g., a message received from the smart dimmer 140, the system controller 150, the network device 160, and/or another device in the system).

FIG. 2 is a simplified block diagram of an example smart lighting device 210 (e.g., a smart bulb) that may be deployed as, for example, the smart bulbs 120a, 120b of the load control system 100 shown in FIG. 1A, the smart bulbs 120a, 120b, 120c shown in FIG. 1B, and/or the smart bulbs 120a, 120b shown in FIG. 1C. As shown, the smart lighting device 210 includes a hot connection H and a neutral connection N that are configured to be electrically coupled to an AC power source, such as the AC power source 102 (e.g., via a screw-in base) for receipt of an input voltage (e.g., an AC mains voltage).

The smart lighting device 210 may include a light source 214 (e.g., a lighting load) and a load regulation circuit 212 for controlling an intensity level of the light source 214. The smart lighting device 210 may include an electromagnetic interference (EMI) filter circuit 216 that may operate to mitigate (e.g., prevent) noise generated by the load regulation circuit 212 from being conducted on the AC mains wiring. The smart lighting device 210 may include a rectifier circuit 218 for generating a direct-current (DC) bus voltage $V_{BUS}$ (e.g., a rectified voltage) across a bus capacitor $C_{BUS}$. As shown, the load regulation circuit 212 receives the bus voltage $V_{BUS}$ and regulates the power delivered to the light source 214 in order to control the intensity of the light source 214. For example, the load regulation circuit 212 for controlling the light source 214 may include a dimmer circuit for an incandescent lamp, an electronic ballast circuit for a compact fluorescent lamp (CFL), a light-emitting diode (LED) driver for an LED light engine, or the like.

The smart lighting device 210 may include a control circuit 220 operatively coupled to the load regulation circuit 212. The control circuit 220 may operate to control the intensity of the light source 214 via the load regulation circuit 212. The control circuit 220 may include one or more of a processor (e.g., a microprocessor), a microcontroller, a programmable logic device (PLD), a field programmable gate array (FPGA), an application specific integrated circuit (ASIC), or any suitable processing device programmed/configured to provide functions and features as described herein.

The smart lighting device 210 may include a wireless communication circuit 222, for example a radio-frequency (RF) transceiver coupled to an antenna for transmitting and/or receiving the RF signals 106 from wireless control devices (e.g., such as the smart dimmer 140, the sensor 134, and/or other control devices of the load control system 100 shown in FIGS. 1A-1C). Alternatively, the wireless communication circuit 222 may include an RF transmitter for transmitting RF signals, an RF receiver for receiving RF signals, or an infrared (IR) receiver for receiving IR signals. In addition, the wireless communication circuit 222 may be coupled to the electrical wiring between the smart lighting device 210 and a smart load control device and may be configured to receive a control signal from the smart load control device via the electrical wiring using, for example, a power-line carrier (PLC) communication technique. The control circuit 220 may be configured to recognize whether it is electrically connected to the same circuit as a load control device that is capable of transmitting control instructions in messages, for example, a smart load control device (e.g., the smart dimmer 140). For example, the control circuit 220 may determine whether the wireless communication circuit 222 has received a message from the load control device. The control circuit 220 may determine that the load control device is a smart load control device based on receipt of a message from the load control device by the wireless communication circuit 222.

The smart lighting device 210 may include a memory 224 communicatively coupled to the control circuit 220. The control circuit 220 may be configured to use the memory 224 for the storage and/or retrieval of, for example, unique identifiers (e.g., serial numbers) of the wireless remote control devices to which the smart lighting device 210 is responsive. The memory 224 may be implemented as an external integrated circuit (IC) or as an internal circuit of the control circuit 220.

The smart lighting device 210 may include an actuator 226 that may be operatively coupled to the control circuit 220. The actuator 226 may be actuated to associate the lighting device 210 with one or more of the wireless remote control devices. For example, the actuator 226 may be mechanically coupled to the actuator 118 shown in FIG. 1.

The smart lighting device 210 may include a power supply 228 coupled to the bus voltage $V_{BUS}$ for generating a DC supply voltage $V_{CC}$. The supply voltage $V_{CC}$ may be used to power one or more of the control circuit 220, the wireless communication circuit 222, the memory 224, and other low-voltage circuitry of the smart lighting device 210.

The smart lighting device 210 may include a phase-angle detect circuit 230 coupled to the hot connection H and the neutral connection N for detecting whether a phase-control signal is being received. For example, the phase-angle detect circuit 230 may determine whether the phase-control signal is being received based on the existence of rising edges and/or falling edges of the phase-control signal. The phase-angle detect circuit 230 may detect the rising edges and/or falling edges of the phase-control signal by determining when the magnitude of the phase-control signal falls above or falls below a threshold (e.g., approximately 40 volts). The control circuit 220 may be configured to recognize whether the smart lighting device 210 is electrically connected to the same circuit as a load control device that is incapable of transmitting and/or receiving control instructions in messages. The control circuit 220 (e.g., via the phase-angle detect circuit 230) may detect the phase-control signal from the load control device. Detection of the phase-control signal from the load control device may indicate that the load control device is incapable of transmitting control instructions in messages. Alternatively or additionally, detection of the phase-control signal and not receiving control instructions in messages from the load control device (e.g., within a predetermined period or in response to actuation of the load control device) may indicate that the load control device is a non-smart load control device (e.g., such as the dimmer 130 of FIG. 1A). The control circuit 220 may provide feedback indicating that it is configured to receive control instructions in messages (e.g., by transmitting a message via the wireless communication circuit 222).

It should be appreciated that the smart lighting device 210 shown in FIG. 2 is just an example of a smart lighting device that could be used as described herein. For example, the smart lighting device 210 may include other features not shown in FIG. 2, for example, such as generating light of varying colors.

Figure 3:
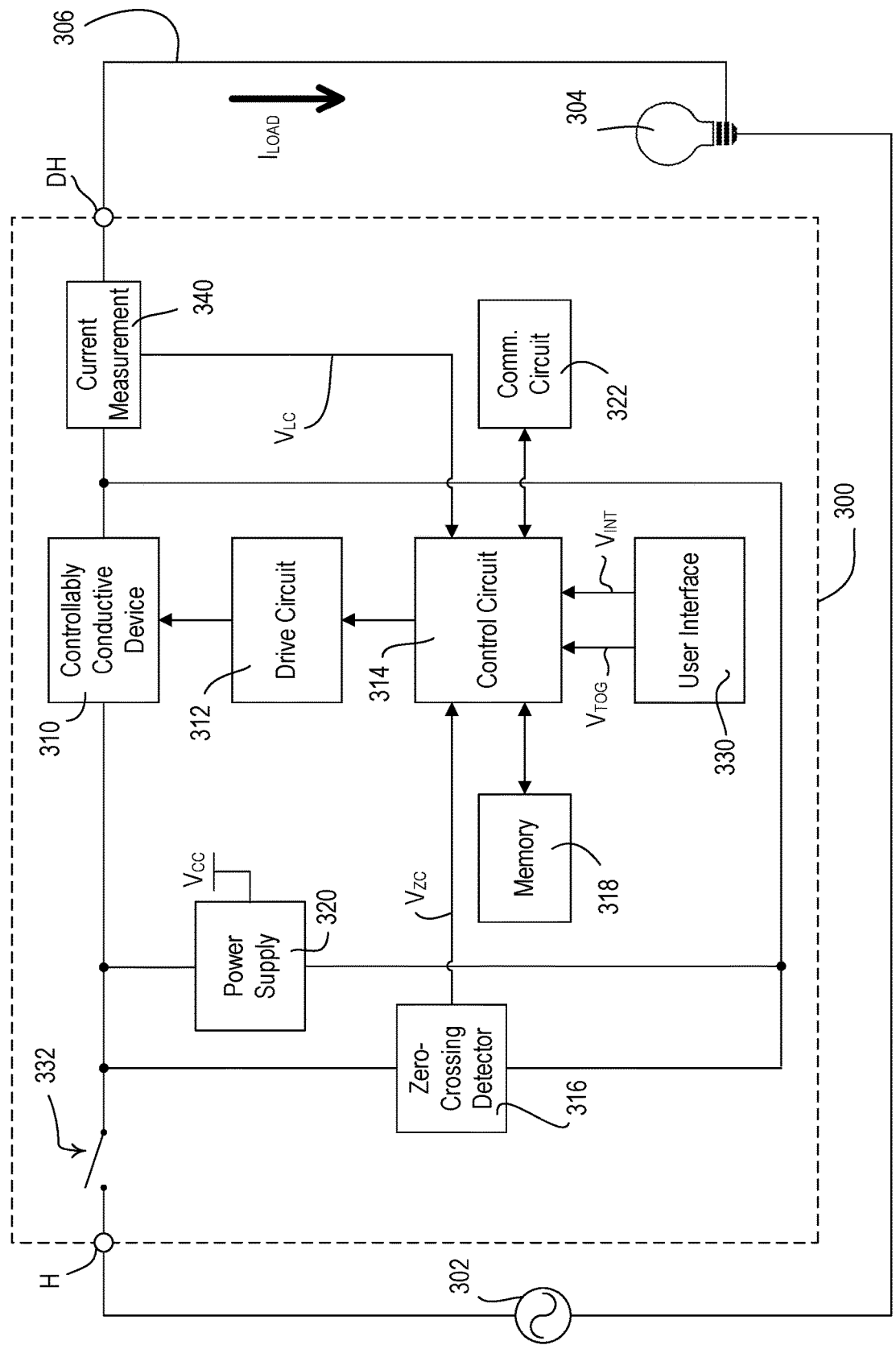
FIG. 3. depicts a simplified block diagram of an example control device that may be deployed as a dimmer (e.g., a dimmer switch) of the load control system illustrated in FIG. 1.

FIG. 3 is a simplified block diagram of an example smart load control device 300 (e.g., a smart dimmer) that may be deployed as, for example, the smart dimmer 140 of the lighting control system 100 shown in FIGS. 1B and 1C. The load control device 300 may include a hot terminal H that may be adapted to be coupled to an alternating-current (AC) power source 302. The smart load control device 300 may include a dimmed hot terminal DH that may be adapted to be coupled to an electrical load, such as a lighting device 304 (e.g., such as the non-smart bulb 110 and/or the smart bulbs 120a, 120c shown in FIGS. 1A-1C and/or the smart lighting device 210 shown in FIG. 2). The smart load control device 300 may be coupled to the lighting device 304 via a dimmed-hot circuit 306 (e.g., the circuit 104 shown in FIG. 1B and/or the circuit 105 shown in FIG. 1C). The smart load control device 300 may include a controllably conductive device 310 coupled in series electrical connection between the AC power source 302 and the lighting device 304. The controllably conductive device 310 may control the power delivered to the lighting device 304. The controllably conductive device 310 may include a relay and/or a bidirectional semiconductor switch, such as, for example, a triac, a field-effect transistor (FET) in a rectifier bridge, two FETs in anti-series connection, one or more insulated-gate bipolar junction transistors (IGBTs), or other suitable semiconductor switching circuit.

The smart load control device 300 may include a control circuit 314. The control circuit 314 may include one or more of a processor (e.g., a microprocessor), a microcontroller, a programmable logic device (PLD), a field programmable gate array (FPGA), an application specific integrated circuit (ASIC), or any suitable controller or processing device programmed/configured to provide functions and features as described herein. The control circuit 314 may be operatively coupled to a control input of the controllably conductive device 310, for example, via a gate drive circuit 312. The control circuit 314 may be used for rendering the controllably conductive device 310 conductive or non-conductive, for example, to turn the lighting device 304 on and off and/or to control the amount of power delivered to the lighting device 304. The control circuit 314 may be configured to control the controllably conductive device 310 to generate a phase-control signal at the dimmed-hot terminal DH using a phase-control dimming technique (e.g., a forward phase-control dimming technique or a reverse phase-control dimming technique).

The control circuit 314 may receive a zero-cross control signal $V_{ZC}$. The $V_{ZC}$ may be representative of the zero-crossing points of the AC main line voltage of the AC power source 302, from a zero-crossing detector 316. The control circuit 314 may be operable to render the controllably conductive device 310 conductive and/or non-conductive at predetermined times relative to the zero-crossing points of the AC waveform using the phase-control dimming technique.

The smart load control device 300 may include a memory 318. The memory 318 may be communicatively coupled to the control circuit 314 for the storage and/or retrieval of, for example, operational settings, such as, lighting presets and associated preset light intensities. The memory 318 may be implemented as an external integrated circuit (IC) or as an internal circuit of the control circuit 314.

The smart load control device 300 may include a power supply 320. The power supply 320 may generate a direct-current (DC) supply voltage $V_{CC}$ for powering the control circuit 314 and the other low-voltage circuitry of the smart load control device 300. The power supply 320 may be coupled in parallel with the controllably conductive device 310. The power supply 320 may be operable to conduct a charging current through the lighting device 304 to generate the DC supply voltage $V_{CC}$.

The smart load control device 300 may comprise a communication circuit 522. The communication circuit 322 may comprise a wireless communication circuit, for example, a radio-frequency (RF) transceiver coupled to an antenna for transmitting and/or receiving RF signals. In addition, the communication circuit 322 may comprise an RF transmitter for transmitting RF signals, and/or an RF receiver for receiving RF signals. In addition, the communication circuit 322 may be coupled to the electrical wiring between the smart load control device 300 and the lighting device 304 and may be configured to transmit a control signal to the lighting device 304 via the electrical wiring using, for example, a power-line carrier (PLC) communication technique. The communication circuit 322 may be configured to transmit a control signal that includes the control instructions (e.g., in a message) generated by the control circuit 314 to the lighting device 304. As described herein, the control instructions may be generated in response to a user input to adjust one or more operational aspects of the lighting device 304. The control instructions may include a command and/or identification information (e.g., such as a unique identifier) associated with the lighting device 304. In addition to or in lieu of transmitting the control signal to the lighting device 304, the communication circuit 322 may be controlled to transmit the control signal to a central controller of the lighting control system.

The control circuit 314 may be responsive to inputs received from a user interface 330. For example, the user interface 330 may comprise a toggle actuator (e.g., the toggle actuator 142 of the smart dimmer 140) and/or a level-adjustment actuator (e.g., the level-adjustment actuator 144 of the smart dimmer 140). The user interface 330 may be configured to generate a toggle control signal $V_{TOG}$ that indicates actuations of the toggle actuator. For example, the user interface 330 may comprise a momentary tactile switch that may be temporarily closed in response to actuations of the toggle actuator. The user interface 330 may also be configured to generate an intensity control signal $V_{INT}$ that indicates the intensity to which to control the lighting device 304. For example, the intensity control signal $V_{INT}$ may comprise a direct-current (DC) voltage having a magnitude that is responsive to actuations of the level-adjustment actuator. The control circuit 314 may be configured to receive the toggle control signal $V_{TOG}$ and the intensity control signal $V_{INT}$ from the user interface 330. The control circuit 314 may be configured to control the controllably conductive device 310 to turn the lighting device 304 on and off in response to the toggle control signal $V_{TOG}$ and/or to adjust the intensity of the lighting device 304 in response to the intensity control signal $V_{INT}$. In addition, the user interface 330 may comprise a maintained mechanical switch 332 (e.g., an air-gap switch) that may be coupled in series between the hot terminal H and the dimmed hot terminal DH (e.g., in series with the controllably conductive device 310). The maintained mechanical switch 332 may be opened and closed (e.g., toggled between an open state and a closed state) in response to actuations of the rotary knob that push the shaft of the user interface 330 in towards the faceplate to connect and disconnect the lighting device 304 from the AC power source 302 to turn the lighting device 304 on and off, respectively.

The smart load control device 300 may include an integral power measurement circuit, such as a current measurement circuit 340 configured to measure a magnitude of a load current $I_{LOAD}$ conducted through the dimmed-hot terminal DH and thus the lighting devices (e.g., the lighting device 304) connected to the circuit controlled by the smart load control device 300. The current measurement circuit 340 may be configured to generate a load current signal $V_{LC}$ that may have a magnitude that indicates the magnitude of the load current $I_{LOAD}$. The control circuit 314 may be configured to receive the load current signal $V_{LC}$ and to determine the magnitude of the load current $I_{LOAD}$. The control circuit 314 may determine how many lighting devices are connected to the dimmed-hot terminal DH (e.g., the circuit controlled by the smart load control device 300) based on the magnitude of the load current determined by the current measurement circuit. A load control device capable of power measurement is described in greater detail in commonly-assigned U.S. patent application Ser. No. 13/793,308, filed Mar. 11, 2013, entitled POWER MEASUREMENT IN A TWO-WIRE LOAD CONTROL DEVICE, the entire disclosure of which is hereby incorporated by reference. When the lighting device 304 is a smart lighting device, the lighting device 304 may be configured to recognize whether the lighting device 304 is electrically connected to the same circuit as a load control device that is capable of transmitting control instructions in messages, for example, a smart load control device (e.g., the smart load control device 300). The lighting device 304 may be initially configured to respond to a phase-control signal. The lighting device 304 may receive a smart device identification message from the smart load control device 300. The smart device identification message may be used to identify a load control device as a smart load control device. The smart device identification message may include a unique identifier of the smart load control device 300. The smart lighting device 304 may store the unique identifier of the smart load control device 300 in memory (e.g., the memory 224). Upon receipt of the unique identifier, the lighting device 304 may transmit its own unique identifier (e.g., via another smart device identification message) to the smart load control device 300. The smart load control device 400 may store the unique identifier of the lighting device 304 in memory. Additionally or alternatively, the lighting device 304 may be programmed by one or more other devices (e.g., such as the network device 160 shown in FIG. 1) to be associated with a smart load control device 300 in memory. Additionally or alternatively, the smart load control device 300 may be programmed by one or more other devices (e.g., such as the network device 160 shown in FIG. 1) to be associated with one or more smart lighting devices (e.g., such as the lighting device 304) in memory. Upon receipt of the smart device identification message, the lighting device 304 may switch to wireless control. For example, the lighting device 304 may determine to ignore phase-control signals while responding to control instructions received in messages. The lighting device 304 may transmit a message to the smart load control device 300 indicating that it is responsive to control instructions received in messages.

A smart bulb (e.g., the smart bulb 120a shown in FIG. 1A and/or the smart lighting device 210 shown in FIG. 2) may be configured to determine whether it is receiving a phase-control signal (e.g., via the hot connection H and the neutral connection N) from a load control device (e.g., such as the dimmer 130 shown in FIG. 1A and/or the smart dimmer 140 shown in FIGS. 1B and 1C). When the smart bulb is receiving a phase-control signal and does not receive any messages, the smart bulb may be configured to provide feedback to a user. For example, the smart bulb may transmit a message including feedback information. The feedback information may indicate that the smart bulb is receiving a phase-control signal and/or being controlled by a non-smart load control device. The feedback information may also indicate that the user should replace the load control device (e.g., non-smart load control device) with a smart load control device. When the smart bulb is receiving a phase-control signal and control instructions in messages, the smart bulb may determine whether to control its lighting load using the phase-control signal and/or control instructions in messages.

An example non-smart load control device (e.g., a non-smart dimmer) or non-smart bulb may be configured differently. The non-smart load control device or non-smart bulb may comprise a control circuit that has lesser processing power than a smart load control device or smart bulb. For example, the non-smart load control device or non-smart bulb may comprise an analog control circuit or a microprocessor. The non-smart load control device or non-smart bulb may fail to include a communication circuit, or may have a limited communication circuit (e.g., transmit-only communication circuit) for enabling limited communications. The non-smart load control device may be coupled to the hot connection H, but fail to be coupled to a neutral connection N. Though examples are provided for limitations of the non-smart load control device (e.g., a non-smart dimmer) and non-smart bulb, other limitations in the configuration may also exist.

Figure 4:
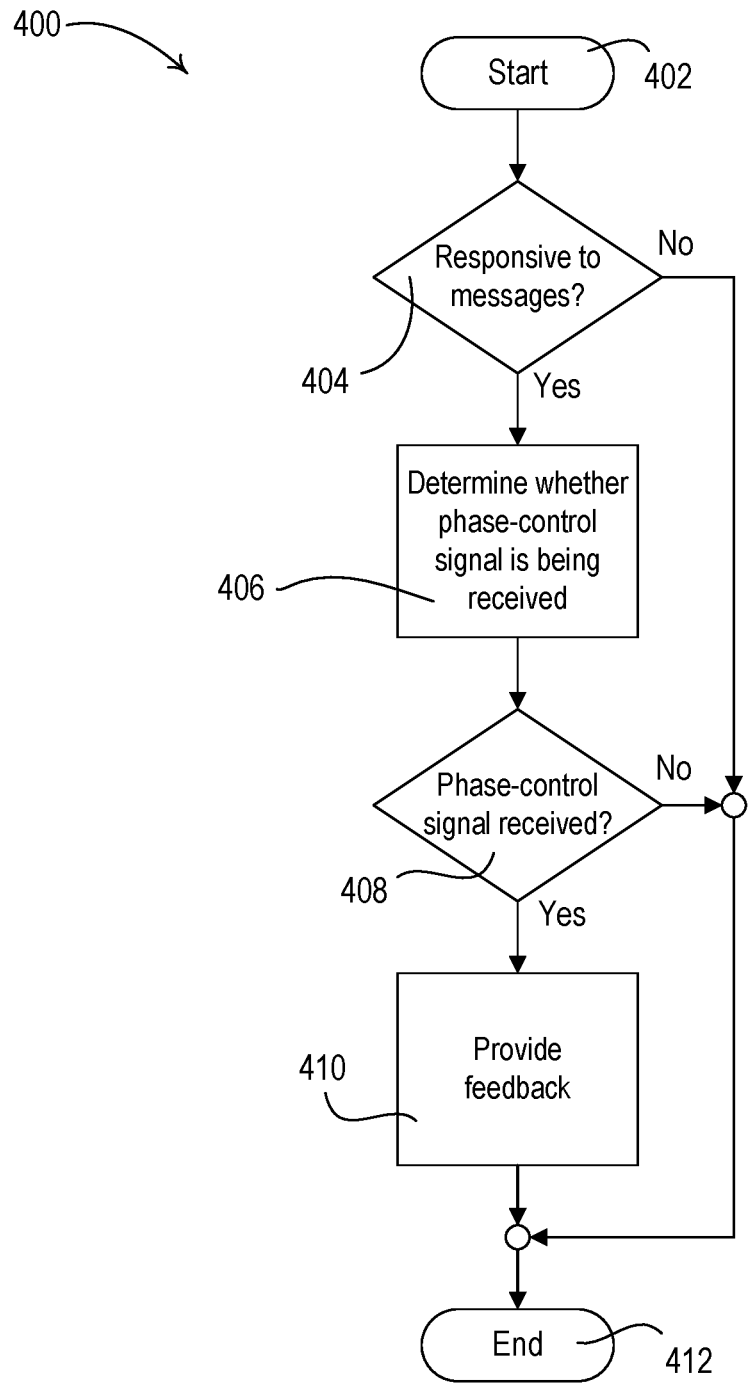
FIG. 4 is a flowchart depicting an example method for configuration of a smart lighting device electrically connected to a circuit (e.g., a dimmed-hot circuit) of a non-smart load control device.

FIG. 4 is a flowchart depicting an example method 400 for configuration of a smart bulb (e.g., such as the smart bulb 120a shown in FIG. 1A) electrically connected to a dimmed-hot circuit (e.g., a controlled circuit) of a load control device. For example, the smart bulb may be electrically connected to a non-smart load control device. The non-smart load control device may be a non-smart dimmer (e.g., such as the dimmer 130 shown in FIG. 1A). The method 400 may be executed as part of a configuration procedure (e.g., a commissioning procedure). The method 400 may be implemented by one or more devices. The method 400 may be executed by a control circuit of a smart bulb (e.g., a control circuit of the smart bulb 120a shown in FIG. 1A and/or the control circuit 220 of the smart lighting device 210 shown in FIG. 2). For example, the method 400 may be executed by the control circuit of a smart bulb to inform a user that the smart bulb is being controlled by (e.g., electrically connected to a circuit controlled by) a non-smart load control device (e.g., receiving a phase-control signal). For example, the control circuit may execute the method 400 periodically at 402. In addition, the control circuit may execute the method 400 at 402 in response to the smart bulb being powered up.

At 404, the control circuit of the smart bulb may determine whether the smart bulb is configured to be responsive to control instructions in messages (e.g., received via wireless signals, such as the RF signals 106). For example, the control circuit may be configured (e.g., initially programmed) to be responsive to control instructions received in messages during manufacturing and/or at power up (e.g., first power up) of the smart bulb. If the control circuit is not responsive to control instructions received in messages at 404, the method 400 may end at 412.

If the control circuit is configured to be responsive to control instructions received in messages at 404, the control circuit may determine at 406 whether a phase-control signal is being received, for example, from the non-smart load control device. The smart bulb may include a phase-angle detect circuit (e.g., the phase-angle detect circuit 230) that is configured to determine or detect whether an input voltage (e.g., an AC mains voltage) is a phase-control signal. For example, the control circuit may determine whether the non-smart load control device is generating the phase-control signal. The phase-angle detect circuit may determine that the phase-control signal is being received based on a determination of the existence of rising edges and/or falling edges of the phase-control signal. The phase-angle detect circuit may detect the rising edges and/or the falling edges of the phase-control signal determining when the magnitude of the input voltage rises above or drops below a threshold (e.g., approximately 40 volts). If a phase-control signal is not being received at 408, the method 400 may end at 412.

When a phase-control signal is being received at 408, the control circuit of the smart bulb may provide feedback to indicate that the smart bulb is receiving the phase-control signal at 410. The control circuit may, for example, transmit a message indicating that the smart bulb is receiving the phase-control signal at 406. For example, the smart bulb may broadcast the message at 406. A broadcast message may be capable of being received and processed by any device that is capable of communication via the same wireless protocol and/or channel, and is within wireless range of the transmitting device, such as a network device (e.g., the network device 160). The message may include feedback to be provided to a user. The message may be received by the network device directly and/or via the system controller. The message may be received by the network device for displaying a warning to a user. The warning may include an indication of the features that may be unavailable for control on the smart bulb due to the limited control available. The warning may indicate that the non-smart load control device should be replaced (e.g., with a smart load control device).

Alternatively or additionally, the control circuit of the smart bulb may provide feedback to the user via a visual indication at the smart bulb at 410. The control circuit may change a state of the lighting load to provide the feedback to the user. For example, the smart bulb may flash the lighting load and/or adjust a color (e.g., color temperature) of the lighting load. In examples, the control circuit may blink the lighting load red to provide the feedback to the user. The smart bulb may determine that the load control device should be replaced in response to receipt of the phase-control signal. The feedback may indicate to the user that the load control device should be replaced (e.g., with a smart load control device). After the smart bulb provides feedback at 410, the method 400 may end at 412.

A smart bulb (e.g., the smart bulbs 120a, 120c shown in FIG. 1B and/or the smart bulb 120a shown in FIG. 1C) may be configured to recognize whether it is electrically connected to the same circuit as a smart load control device (e.g., smart dimmer 140 shown in FIGS. 1B and 1C). For example, the smart bulb may receive a message from the smart load control device that includes control instructions. The smart bulb may be initially configured to respond to a phase-control signal. Upon receipt of a control instructions in messages received via wireless signals (e.g., from the smart load control device), the smart bulb may switch to wireless control. For example, the smart bulb may determine to ignore a phase-control signal while responding to control instructions in messages. The smart bulb may transmit a message to the smart load control device indicating that the smart bulb is responsive to control instructions in messages.

Figure 5:
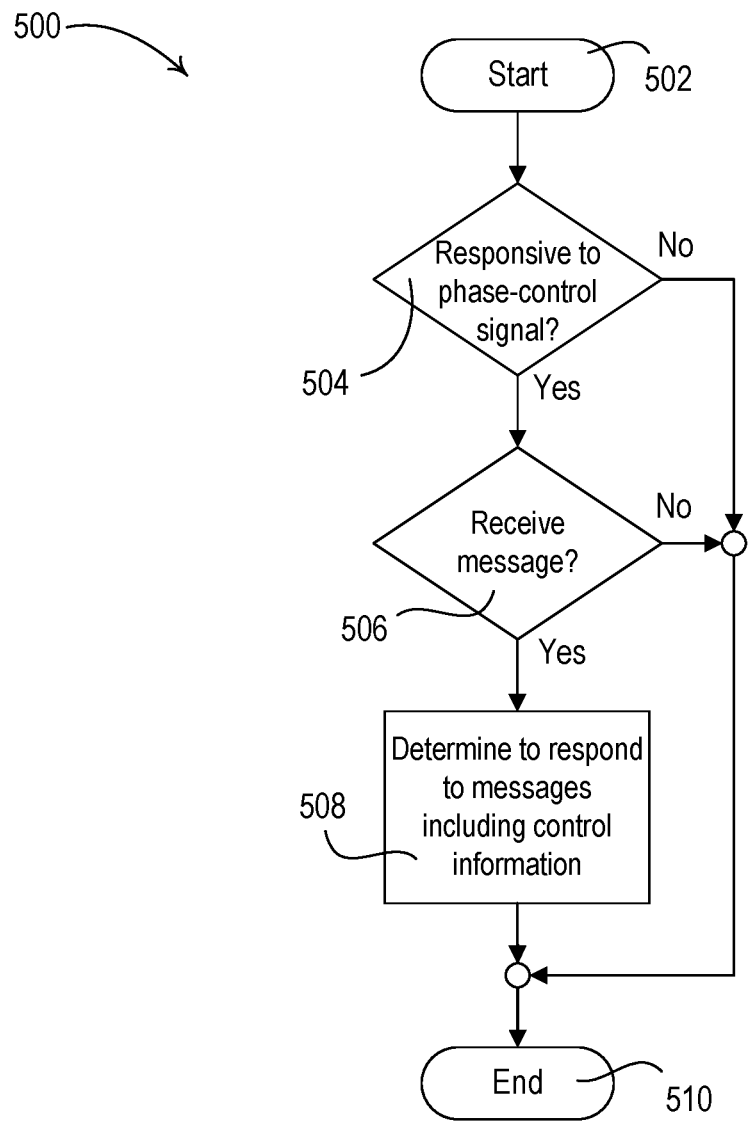
FIG. 5 is a flowchart depicting an example method for configuration of a smart lighting device electrically connected to a circuit (e.g., a dimmed-hot circuit) of a smart load control device.

FIG. 5 is a flowchart depicting an example method 500 for configuration of a smart bulb (e.g., the smart bulbs 120a, 120c shown in FIG. 1B) electrically connected to a dimmed-hot circuit (e.g., a controlled circuit) of a load control device that is capable of transmitting control instructions in messages (e.g., a smart load control device). The smart load control device may be a smart dimmer (e.g., such as the smart dimmer 140 shown in FIG. 1B). The method 500 may be executed as part of a configuration procedure (e.g., a commissioning procedure). The method 500 may be implemented by one or more devices. The method 500 may be executed by a control circuit of a smart bulb (e.g., a control circuit of the smart bulb 120a shown in FIG. 1B and/or the smart bulb 120c shown in FIG. 1B, and/or the control circuit 220 of the lighting device 200 shown in FIG. 2) to determine whether to respond to a phase-control signal or control instructions in messages. For example, the control circuit may execute the method 500 periodically at 502. In addition, the control circuit may execute the method 500 at 502 in response to the smart bulb receiving power on the dimmed-hot circuit of the smart load control device.

At 504, the control circuit of the smart bulb may determine whether the smart bulb is configured to be responsive to a phase-control signal. For example, the control circuit may be configured (e.g., initially programmed) to be responsive to the phase-control signal during manufacturing and/or at power up (e.g., first power up) of the smart bulb. If the smart bulb is not responsive to the phase-control signal at 504, the method 500 may end at 510.

If the smart bulb is configured to be responsive to the phase-control signal at 504, the control circuit may determine whether a message has been received (e.g., from the smart load control device) at 506. For example, the message may be transmitted to the smart bulb from the smart load control device (e.g., that is coupled to the smart bulb), a system controller (e.g., the system controller 150), and/or a network device (e.g., the network device 160). The message may include, for example, configuration information that indicates that the smart bulb should be responsive to control instructions included in messages (e.g., received via the wireless signals). In addition, the message may include, for example, control instructions such as control instructions for the control circuit to control a state of a lighting load of the smart bulb. The state of the lighting load may include an on/off state, an intensity level, a color (e.g., a color temperature), and/or the like. When the smart bulb does not receive a message at 506, the method 500 my end at 510. When the smart bulb determines that the message has been received at 506, the smart bulb may determine at 508 to respond to messages including control instructions (e.g., to control the lighting load based on the control instructions) received from the smart load control device. The method 500 may end at 510.

A smart load control device (e.g., the smart dimmer 140 shown in FIGS. 1B and 1C) may be configured to recognize whether it is electrically connected to a dimmed-hot circuit (e.g., a controlled circuit) having all smart bulbs and no non-smart bulbs (e.g., a non-mixed circuit as shown in FIG. 1B). The smart load control device may be configured to control the smart bulbs on the non-mixed circuit by transmitting messages including control instructions to the smart bulbs, when the smart load control device is in a maintained conduction mode.

Figure 6:
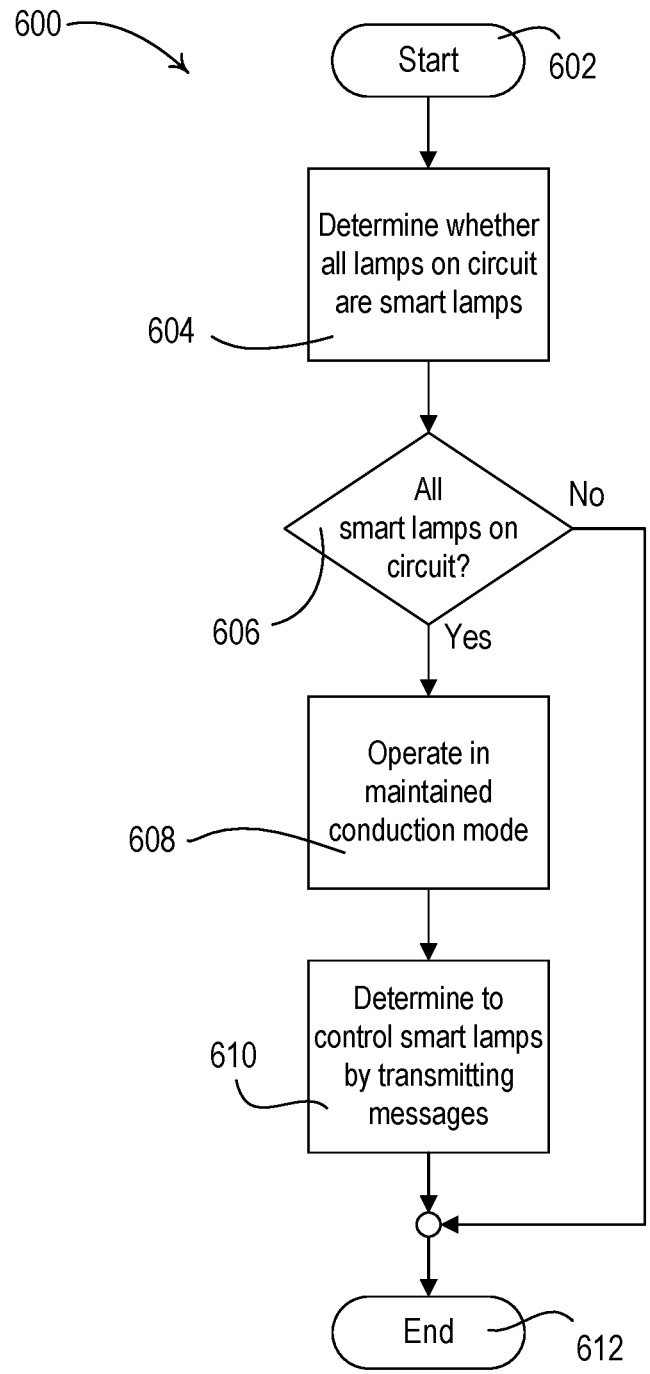
FIG. 6 is a flowchart depicting an example method for configuration of a smart load control device that may be controlling a smart lighting device.

FIG. 6 is a flowchart depicting an example method 600 for configuration of a smart load control device (e.g., the smart dimmer 140 shown in FIG. 1B) electrically connected to a dimmed-hot circuit (e.g., a controlled circuit) with one or more smart bulbs (e.g., the smart bulbs 120a, 120c shown in FIG. 1B). The load control device may be capable of transmitting control instructions in messages. The method 600 may be executed as part of a configuration procedure (e.g., a commissioning procedure). The method 600 may be implemented by one or more devices. The method 600 may be executed by a control circuit of the smart load control device (e.g., a control circuit of the smart dimmer 140 shown in FIG. 1B and/or the control circuit 314 of the smart load control device 300 shown in FIG. 3). For example, the control circuit may execute the method 600 periodically at 602. In addition, the control circuit may execute the method 600 may be executed at 602 in response to the smart load control device receiving power.

At 604, the control circuit of the smart load control device may determine whether each (e.g., all) of the lamps on the dimmed-hot circuit of the smart load control device are smart bulbs. For example, the control circuit may receive a message including an indication that all of the lamps on the dimmed-hot circuit are smart bulbs (e.g., the dimmed-hot circuit is a non-mixed circuit as shown in FIG. 1B). The control circuit may receive the message from, for example, a system controller (e.g., the system controller 150) and/or a network device (e.g., the network device 160). In addition, the control circuit of the smart load control device may be configured to transmit a message including control instructions to turn off to the smart bulbs on the dimmed-hot circuit and then measure a magnitude of a load current conducted through the dimmed-hot circuit. If the magnitude of the load current conducted through the dimmed-hot circuit is less than a threshold current, the control circuit may be configured to determine that all of the lamps on the dimmed-hot circuit are smart bulbs. Further, the control circuit of the smart load control device may be configured to determine whether all of the lamps on the dimmed-hot circuit are smart bulbs in response to the light level in the area (e.g., as measured by the sensor 134). For example, the control circuit may be configured to transmit a message including control instructions to turn off to the smart bulbs in the dimmed-hot circuit and then determine the light level in the area. If there are lamps on the control circuit of the smart load control device that are still on, the control circuit may be configured to determine that some of the lamps on the dimmed-hot circuit are non-smart bulbs. For example, the control circuit of the smart load control device may be configured to determine if there are lamps on the control circuit of the smart load control device that are still on by removing power from all of the lamps on the dimmed-hot circuit, and then determining the light level in the area. If the light level in the area after transmitting the command to turn off the smart bulbs is greater than the light level in the area after power is removed, the control circuit may be configured to determine that there are non-smart bulbs on the dimmed-hot circuit (e.g., the dimmed-hot circuit is not a non-mixed circuit having all smart bulbs). When all lamps on the dimmed-hot circuit are not smart bulbs at 606 (e.g., the dimmed-hot circuit is a mixed circuit as shown in FIG. 1C), the method 600 may end at 612.

When all lamps on the dimmed-hot circuit are smart bulbs at 606 (e.g., the dimmed-hot circuit is a non-mixed circuit as shown in FIG. 1B), the control circuit of the smart load control device may operate in a maintained conduction mode (e.g., such as a full-conduction mode) at 608. When in the maintained conduction mode, the control circuit may control a controllably conductive device (e.g., the controllably conductive device 310) to stay at a high-end intensity setting (e.g., a maximum amount of power that can be provided to the smart bulbs 120a, 120c electrically connected to the circuit 104 of FIG. 1B). The high-end intensity setting may be a high-end trim setting. For example, the control circuit may stop controlling the controllably conductive device to adjust the phase angle of the phase-control signal and may set the phase angle of the phase-control signal to a maximum phase angle that may be provided to the smart bulbs while still allowing a power supply (e.g., the power supply 320) of the smart load control device charge. The maintained conduction mode may enable the smart bulbs on the dimmed-hot circuit of the smart load control device to receive a maximum amount of power for being able to control in the respective light sources in response to messages including control instructions. The load control device operating at the high-end intensity setting, or another predefined setting for the amount of power being provided for controlling the light sources, may allow for control of one or more control features (e.g., including dimming, etc.) using the messages that may be unavailable at a low-end trim setting, or another predefined setting for providing a lower amount of power. For example, certain color or lighting intensity settings may be available when the load control device is operating at the high-end intensity setting, or another predefined setting for the amount of power being provided for controlling the light sources.

At 610, the control circuit of the smart load control device may determine to control the smart bulbs on the dimmed-hot circuit by transmitting control instructions (e.g., dimming instructions, etc.) in messages via the wireless signals (e.g., while in the maintained conduction mode). The control circuit may turn the smart bulbs on and off by transmitting control instructions in messages to the smart bulbs, where the control instructions include commands for turning the smart bulbs on and off. In addition, the control circuit may control the controllably conductive device to may turn the smart bulbs on and off (e.g., in unison) by applying and removing power, respectively, to the smart bulbs. The method 600 may end at 612.

The smart load control device may be capable of controlling bulbs using phase control and/or digital control messages. A smart load control device may determine how to control the bulbs on the dimmed-hot circuit to which the smart load control device is electrically connected based on whether the dimmed-hot circuit is a mixed circuit. When a smart load control device determines that its dimmed-hot circuit is a mixed circuit, the smart load control device may determine to control all bulbs on the dimmed-hot circuit (e.g., both smart bulbs and non-smart bulbs) using phase control.

Figure 7:
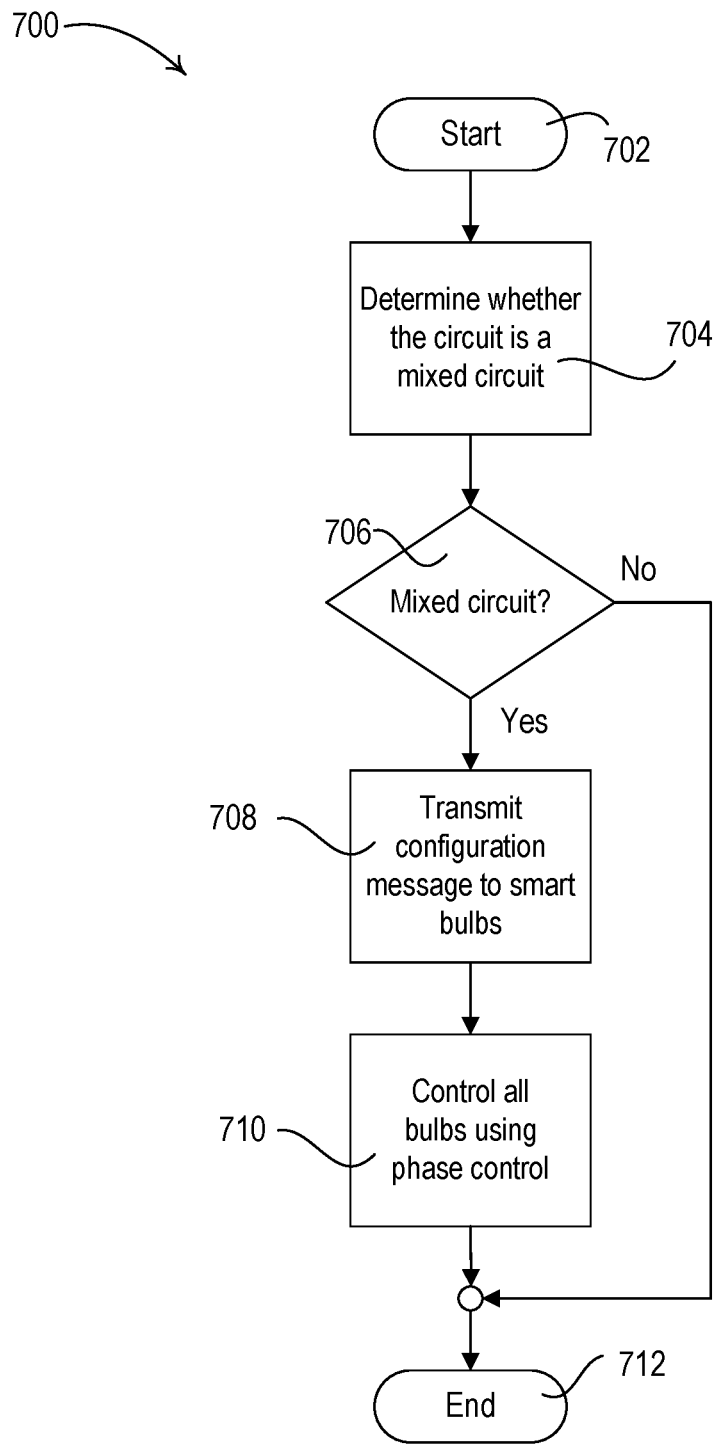
FIG. 7 is a flowchart depicting an example method for a smart lighting device to determine whether a circuit (e.g., a dimmed-hot circuit) is a mixed circuit or a non-mixed circuit.

FIG. 7 is a flowchart depicting an example method 700 for controlling lighting devices (e.g., the smart bulbs 120a, 120c) based on whether a load control device is electrically connected to a mixed circuit (e.g., as shown in FIG. 1C) or a non-mixed circuit (e.g., as shown in FIG. 1B). The load control device may be capable of transmitting control instructions in messages (e.g., a smart load control device). The smart load control device may be a smart dimmer (e.g., such as the smart dimmer 140 shown in FIGS. 1B and 1C). The method 700 may be executed as part of a configuration procedure (e.g., a commissioning procedure). The method 700 may be implemented by one or more devices. The method 700 may be executed by a control circuit of a load control device (e.g., a control circuit of the smart dimmer 140 and/or the control circuit 314 of the smart load control device 300 shown in FIG. 3). The load control device may be capable of communicating control instructions in messages. For example, the load control device may be a smart load control device (e.g., such as smart dimmer 140 shown in FIGS. 1B and 1C). The method 700 may be executed by the control circuit of the smart load control device (e.g., the smart dimmer 140 shown in FIG. 1C and/or the load control device 300 shown in FIG. 3) to control one or more lighting devices electrically connected to a dimmed-hot circuit controlled by the smart load control device. For example, the control circuit may execute the method 700 periodically at 702. In addition, the control circuit may execute the method 700 at 702 in response to the smart load control device determining that a lighting device has been added to the circuit. Alternatively or additionally, the control circuit may execute the method 700 at 702 in response to the smart load control device being added to the circuit.

At 704, the control circuit of the smart load control device may determine whether the dimmed-hot circuit is a mixed circuit (e.g., having both smart bulbs and non-smart bulbs). The control circuit may determine whether the dimmed-hot circuit is a mixed circuit using similar techniques as performed at 808 of the method 800 shown in FIG. 8. For example, the control circuit may receive a message including an indication that the dimmed-hot circuit is a mixed circuit (e.g., from a system controller and/or a network device). In addition, the control circuit of the smart load control device may determine whether the dimmed-hot circuit is a mixed circuit in response to the light level in the area and/or in response to the magnitude of a load current conducted through the dimmed-hot circuit (e.g., as described above with reference to FIG. 8). When the dimmed-hot circuit is not a mixed circuit (e.g., the dimmed-hot circuit includes only smart bulbs or only non-smart bulbs) at 706, the method 700 may end at 712.

When the dimmed-hot circuit is a mixed circuit (e.g., the dimmed-hot circuit includes at least one smart bulb and at least one non-smart bulb) at 706, the control circuit of the smart load control device may transmit a configuration message to the smart bulbs connected to the dimmed-hot circuit at 708. For example, the configuration message may include an indication that the dimmed-hot circuit is a mixed circuit, and the smart bulbs may determine to respond to a phase-control signal generated by the smart load control device. In addition, the configuration message may include configuration data for configured the smart bulbs to response to the phase-control signal generated by the smart load control device. At 710, the control circuit may determine to control all of the bulbs (e.g., the smart bulbs and the non-smart bulb) coupled to the dimmed-hot circuit using phase control. For example, the control circuit may control a controllably conductive device (e.g., a controllably conductive device 310) to generate the phase-control signal (e.g., and not transmit message including control instructions) to control the smart bulbs and the non-smart bulbs on the dimmed-hot circuit. The method 700 may end at 712.

A smart load control device (e.g., the smart dimmer 140 shown in FIG. 1C) may determine whether a circuit (e.g., a dimmed-hot circuit which the smart load control device is configured to control) is a mixed circuit or a non-mixed circuit (e.g., as shown in FIG. 1C). A mixed circuit may include one or more smart bulbs (e.g., wireless controllable bulbs that are capable of responding to control instructions in messages) and one or more non-smart bulbs (e.g., bulbs that are incapable of responding to dimmed-hot control instructions in messages). The smart load control device may determine that the circuit is a mixed circuit by transmitting a message with instructions to turn off the smart bulbs electrically connected to the circuit and/or measuring a magnitude of a load current and/or an amount of light in the area (e.g., space and/or room). A non-mixed circuit may include one of smart bulbs or non-smart bulbs.

While the smart load control device may be configured to take advantage of phase control on a mixed circuit, the smart bulbs on the mixed circuit may not operate with their full capabilities when the smart load control device is using only phase control. The smart load control device may determine how to control the bulbs on the mixed circuit to enable full capabilities of both the non-smart bulbs and the smart bulbs on the mixed circuit.

The smart load control device may determine how to control the smart bulb, for example, based on whether the dimmed-hot circuit is a mixed circuit or a non-mixed circuit. When the dimmed-hot circuit is a mixed circuit, the smart load control device may control the non-smart bulbs electrically connected to the dimmed-hot circuit using a phase-control signal and/or may control the smart bulbs electrically connected to the dimmed-hot circuit using control instructions in messages. In examples, the smart load control device may use phase-control signals and control instructions in messages at the same time on a mixed circuit. In that case, the smart load control device may use the phase-control signals to control the non-smart bulbs and may use the control instructions in messages to control the smart bulbs. The smart load control device may match the dimming range of smart bulbs to match the dimming range of non-smart bulbs electrically connected to the mixed circuit.

When the smart load control device determines that the dimmed-hot circuit is a non-mixed circuit and each of the bulbs electrically connected to the dimmed-hot circuit are smart bulbs, the smart load control device may go to into a maintained conduction mode. The maintained conduction mode may comprise generating a high phase-control angle that is greater than a predefined threshold. For example, when in the maintained conduction mode, the smart load control device may adjust the amount of power delivered to the smart bulbs to be greater than the predefined threshold. The predefined threshold associated with the maintained conduction mode may be 70% of a maximum power level or greater. The maintained conduction mode may ensure that the smart load control device delivers enough power to the smart bulbs so that the smart bulbs can achieve a full range of dimming intensities. The maintained conduction mode may be a full conduction mode (e.g., such as a maximum power level). When in the maintained conduction mode, the smart load control device may control the smart bulbs using control instructions in messages. When the smart load control device determines that the dimmed-hot circuit is a non-mixed circuit and each of the bulbs electrically connected to the circuit are non-smart bulbs, the smart load control device may control the non-smart bulbs using phase control.

Figure 8:
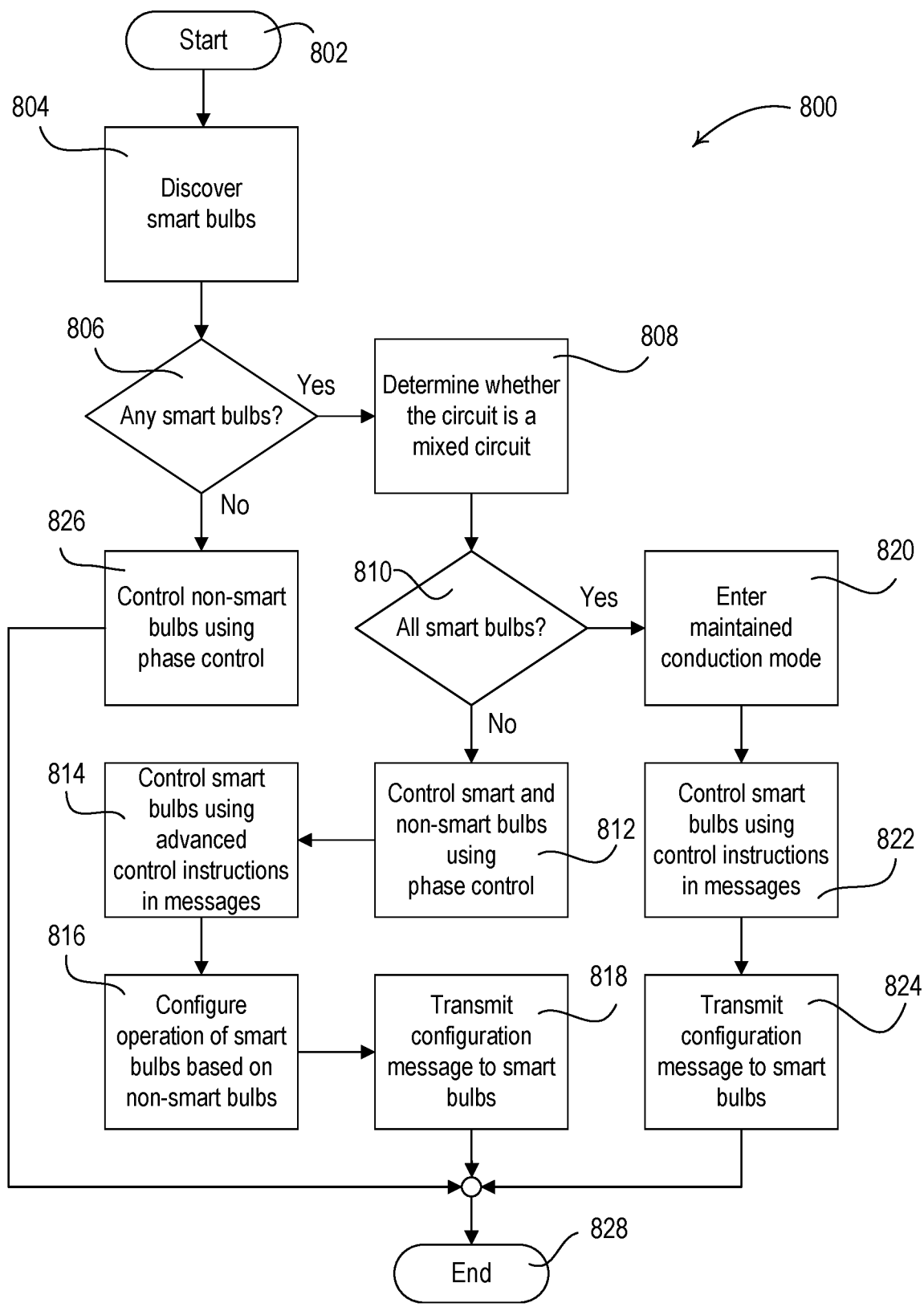
FIG. 8 is a flowchart depicting an example method for a smart load control device to determine whether a circuit (e.g., a dimmed-hot circuit) is a mixed circuit or a non-mixed circuit.

FIG. 8 is a flowchart depicting an example method 800 for controlling lighting devices (e.g., the smart bulbs 120a, 120c) based on whether a load control device is electrically connected to a mixed circuit (e.g., as shown in FIG. 1C) or a non-mixed circuit (e.g., as shown in FIG. 1B). The load control device may be capable of transmitting control instructions in messages (e.g., a smart load control device). The smart load control device may be a smart dimmer (e.g., such as the smart dimmer 140 shown in FIGS. 1B and 1C). The method 800 may be executed as part of a configuration procedure (e.g., a commissioning procedure). The method 800 may be implemented by one or more devices. The method 800 may be executed by a control circuit of a load control device (e.g., a control circuit of the smart dimmer 140 and/or the control circuit 314 of the smart load control device 300 shown in FIG. 3). The load control device may be capable of communicating control instructions in messages. For example, the load control device may be a smart load control device (e.g., such as smart dimmer 140 shown in FIGS. 1B and 1C). The method 800 may be executed by the control circuit of the smart load control device (e.g., the smart dimmer 140 shown in FIG. 1C and/or the load control device 300 shown in FIG. 3) to control one or more lighting devices electrically connected to a dimmed-hot circuit controlled by the smart load control device. For example, the control circuit may execute the method 800 periodically at 802. In addition, the control circuit may execute the method 800 at 802 in response to the smart load control device determining that a lighting device has been added to the circuit. Alternatively or additionally, the control circuit may execute the method 800 at 802 in response to the smart load control device being added to the circuit. Alternatively or additionally, the control circuit may execute the method 800 at 802 in response to actuation of a button on the smart load control device and/or receiving a wireless message (e.g., from a mobile phone).

At 804, the control circuit of the smart load control device may discover one or more smart bulbs. The control circuit of the smart load control device may discover devices by listening or by searching. For example, the control circuit of the smart load control device may initiate discovery or each of the one or more smart bulbs may initiate discovery.

When the control circuit of the smart load control device initiates discovery, at 804, the control circuit of the smart load control device may send (e.g., periodically send) a discovery message (e.g., via an RF protocol such as Bluetooth low energy (BLE)). the control circuit of the smart load control device may receive a discovery-response message from one or more smart bulbs. In response to the discovery-response message, the control circuit of the smart load control device may change a phase angle of the phase control signal to adjust the amount of power delivered to the one or more smart bulbs, for example, as a form of feedback that the discovery-response message has been received. The control circuit of the smart load control device may receive a feedback confirmation message from the one or more smart bulbs indicated that the one or more smart bulbs detected the change of the phase angle of the phase control signal. The control circuit of the smart load control device may transmit a configuration message that includes a unique identifier of the smart load control device to be used for association of the smart load control device with the one or more smart bulbs.

When the one or more smart bulbs initiate discovery, the control circuit of the smart load control device may receive, 804, a discovery message (e.g., such as a beacon) from a smart bulb. For example, the smart bulb may send (e.g., periodically send) a discovery message (e.g., via an RF protocol such as Bluetooth low energy (BLE)). The control circuit of the smart load control device may continuously listen for additional discovery messages. For example, the control circuit of the smart load control device may receive the discovery message upon powering up with the smart bulb and/or when a smart bulb is added to the circuit. In response to the discovery message, the control circuit of the smart load control device may change a phase angle of the phase control signal to adjust the amount of power delivered to the one or more smart bulbs, for example, as a form of feedback that the discovery-response message has been received. The control circuit of the smart load control device may receive a feedback confirmation message from the one or more smart bulbs indicated that the one or more smart bulbs detected the change of the phase angle of the phase control signal. The control circuit of the smart load control device may transmit a configuration message that includes a unique identifier of the smart load control device to be used for association of the smart load control device with the one or more smart bulbs.

The one or more smart bulbs may be bulbs recently added to the circuit. For example, the control circuit may be configured to detect a change in the magnitude of the load current, which may indicate that a new bulb (e.g., a smart bulb and/or a non-smart bulb) has been installed on the dimmed-hot circuit.

At 806, the control circuit of the smart load control device may determine whether any smart bulbs were discovered at 804. When smart bulbs were discovered at 804, the control circuit of the smart load control device may determine, at 808, whether the dimmed-hot circuit is a mixed circuit (e.g., having both smart bulbs and non-smart bulbs). For example, the control circuit may receive a message including an indication that the dimmed-hot circuit is a mixed circuit. The control circuit may receive the message from, for example, a system controller (e.g., the system controller 150) and/or a network device (e.g., the network device 160).

In addition, the control circuit of the smart load control device may determine, at 808, whether the dimmed-hot circuit is a mixed circuit in response to the light level in the area. For example, the control circuit may determine the light level in the area when all by of the bulbs (e.g., smart and/or non-smart bulbs) on the dimmed-hot circuit are on (e.g., at a high-end intensity), subsequently transmit a message including control instructions to turn off the smart bulbs on the dimmed-hot circuit, and then determine the light level in the area. The smart load control device may use a sensor (e.g., such as the sensor 134 shown in FIGS. 1A-1C) to measure the light in the area. For example, the smart load control device may receive a message from the sensor (e.g., in response to a query or transmitted automatically from the sensor) that indicates a light level in the area. If the light level in the area is the same as before the message including the control instructions was transmitted, the control circuit may determine that the dimmed-hot circuit is a non-mixed circuit with all non-smart bulbs. If the light level in the area is not the same as before the message including the control instructions was transmitted, the control circuit may be configured to remove power from each of the lamps on the dimmed-hot circuit, and then determine the light level in the area. If the light level in the area after transmitting the command to turn off the smart bulbs is greater than the light level in the area after power is removed, the control circuit may be configured to determine that the dimmed-hot circuit is a mixed circuit. If the light level in the area after transmitting the command to turn off the smart bulbs is less than the light level in the area after power is removed, the control circuit may be configured to determine that the dimmed-hot circuit is a mixed circuit.

Further, the control circuit of the smart load control device may determine, at 806, whether the dimmed-hot circuit is a mixed circuit in response to the magnitude of a load current conducted through the dimmed-hot circuit. For example, the control circuit of the smart load control device may control the phase-control signal to control all of the bulbs (e.g., smart and/or non-smart bulbs) on the dimmed-hot circuit are on (e.g., at a high-end intensity), subsequently transmit, via the wireless signals, a message including control instructions to turn off to the smart bulbs on the dimmed-hot circuit, and then measure the magnitude of the load current conducted through the dimmed-hot circuit. If the magnitude of the load current conducted through the dimmed-hot circuit is less than a threshold current, the control circuit may be configured to determine that the dimmed-hot circuit is a non-mixed circuit with all smart bulbs. If the magnitude of the load current conducted through the dimmed-hot circuit is greater than the threshold current, the control circuit may determine that the dimmed-hot circuit is a mixed circuit.

At 810, the control circuit of the smart load control device may determine whether all of the bulbs on the circuit are smart bulbs (e.g., whether the circuit is a mixed circuit). When the dimmed-hot circuit is a mixed circuit (e.g., the dimmed-hot circuit includes at least one smart bulb and at least one non-smart bulb), the control circuit of the smart load control device may determine to control, at 812, the bulbs (e.g., smart and non-smart) electrically connected to the dimmed-hot circuit using phase control. For example, the control circuit may determine to control, at 812, smart and non-smart bulbs using phase control. Both smart bulbs and non-smart bulbs may be configured to respond to phase-control for intensity level (e.g., brightness) control. At 814, the control circuit of the smart load control device may determine to control one or more other parameters of the smart bulbs using advanced control instructions in messages. For example, advanced control instructions may be transmitted (e.g., wirelessly transmitted) via messages. The advanced control instructions configured in the message may be configured to control the one or more other parameters of the smart bulbs. The one or more other parameters may include color (e.g., color temperature) and/or control other parameters of the smart bulbs.

At 816, the control circuit of the smart load control device may configure the operation of the smart bulbs on the mixed circuit based on the operation of the non-smart bulbs. For example, the control circuit may adjust a dimming range of the smart bulbs on the mixed circuit to correspond to a dimming range of the non-smart bulbs on the mixed circuit. The smart load control device may have the dimming range of the non-smart bulbs stored in memory. For example, the smart load control device may be configured to determine (e.g., receive) the dimming ranges of one or more non-smart bulbs on the market, and store the dimming range(s) for the non-smart bulbs that are coupled to the mixed circuit in memory. Additionally or alternatively, the smart load control device may be configured to determine the dimming range of the non-smart bulbs (e.g., via information received from the sensor). For example, the smart load control device may be configured to control the non-smart bulbs to a high-end intensity level $L_{HE}$ and then a low-end intensity level $L_{LE}$. The sensor may be configured to measure the light levels at the high-end intensity level $L_{HE}$ and the low-end intensity level $L_{LE}$ and transmit the measured light levels to the smart load control device for determining the dimming range of the non-smart bulbs. After determining the dimming range of the non-smart bulbs, the smart load control device may only transmit to the smart bulbs via the wireless signals control instructions that include intensity levels that corresponds to the dimming range of the non-smart bulbs being controlled by the phase-control signal.

At 818, the control circuit of the smart load control device may transmit one or more configuration messages to the smart bulbs. The configuration messages may be messages configured to cause the smart bulbs to respond to phase control for intensity level (e.g., brightness) control, as determined at 812, for example. The configuration message may be configured to cause the smart bulbs to respond to messages for controlling color and other parameters, as determined at 814, for example. The configuration message may comprise one or more configuration settings, for example, such as an address, a high-end intensity (e.g., high-end trim), a low-end intensity (e.g., low-end trim), a preset intensity level, a preset color, and/or a fade rate. The one or more configuration settings may be associated with a smart bulb that has been replaced, the smart bulbs electrically connected to the circuit, and/or one or more non-smart bulbs electrically connected to the circuit. The method 800 may end at 828.

When the dimmed-hot circuit is not a mixed circuit (e.g., all smart bulbs connected to the dimmed-hot circuit) at 810, the control circuit of the smart load control device may enter a maintained conduction mode (e.g., such as a full-conduction mode) at 820. For example, the control circuit of the smart load control device may enter the maintained conduction mode by controlling a controllably conductive device (e.g., the controllably conductive device 314) into a maintained conduction mode (e.g., such as a full conduction mode) when all of the bulbs on the dimmed-hot circuit are smart bulbs. The maintained conduction mode may enable the smart bulbs of the non-mixed circuit to receive a maximum amount of power from the smart load control device (e.g., the smart bulbs may respond only to control instructions in messages). During the maintained conduction mode, the smart load control device may stay at a high-end intensity setting (e.g., a maximum amount of power that can be provided to the smart bulbs electrically connected to the dimmed-hot circuit). For example, the control circuit of the smart load control device may be configured to provide greater than 70% of the maximum amount of power from the smart load control device. For example, the smart load control device may control the phase angle of the phase control signal to a maximum value when in a full-conduction mode. At 822, the control circuit of the smart load control device may determine to control the smart bulbs electrically connected to the dimmed-hot circuit using control instructions in messages (e.g., only control instructions in messages). When in the maintained conduction mode, the smart load control device may be configured to send control messages instead of adjusting the phase-control signal in response to actuations of a user interface of the smart load control device. When not in the maintained conduction mode, the smart load control device may adjust the phase-control signal in response to actuations of the user interface of the smart load control device.

At 824, the control circuit of the smart load control device may transmit one or more configuration messages to the smart bulbs. The configuration messages may be messages configured to cause the smart bulbs to respond to control instructions in messages (e.g., wireless messages) for intensity level (e.g., brightness) control, as determined at 818, for example. The configuration message may be configured to cause the smart bulbs to also respond to messages for controlling color and other parameters, as determined at 818, for example. The configuration message may comprise one or more configuration settings, for example, such as an address, a high-end intensity (e.g., high-end trim), a low-end intensity (e.g., low-end trim), a preset intensity level, a preset color, and/or a fade rate. The one or more configuration settings may be associated with a smart bulb that has been replaced, the smart bulbs electrically connected to the circuit, and/or one or more non-smart bulbs electrically connected to the circuit. The method 800 may end at 828.

When the smart load control device determines at 806 that each of the bulbs electrically connected to the dimmed-hot circuit are non-smart bulbs, the control circuit of the smart load control device may determine at 826 to control the not-smart bulbs by using phase control. For example, the control circuit may control the controllably conductive device to generate the phase-control signal (e.g., and not transmit message including control instructions) to control the non-smart bulbs. The method 800 may end at 828.

A smart load control device (e.g., the smart dimmer 140 shown in FIGS. 1B and 1C) may be configured to recognize whether a new bulb has been connected to a dimmed-hot circuit (e.g., a controlled circuit) of the smart load control device. The smart load control device may be configured to associate (e.g., automatically associate) with a new smart bulb connected to the dimmed-hot circuit and transmit one or more control features (e.g., operational parameters) and/or one or more configuration settings to the new smart bulb. The smart load control device may determine the one or more control features and/or the one or more configuration settings for the smart bulb based on a previously installed smart bulb and/or another smart bulb electrically connected to the dimmed-hot circuit of the smart load control device.

Figure 9A:
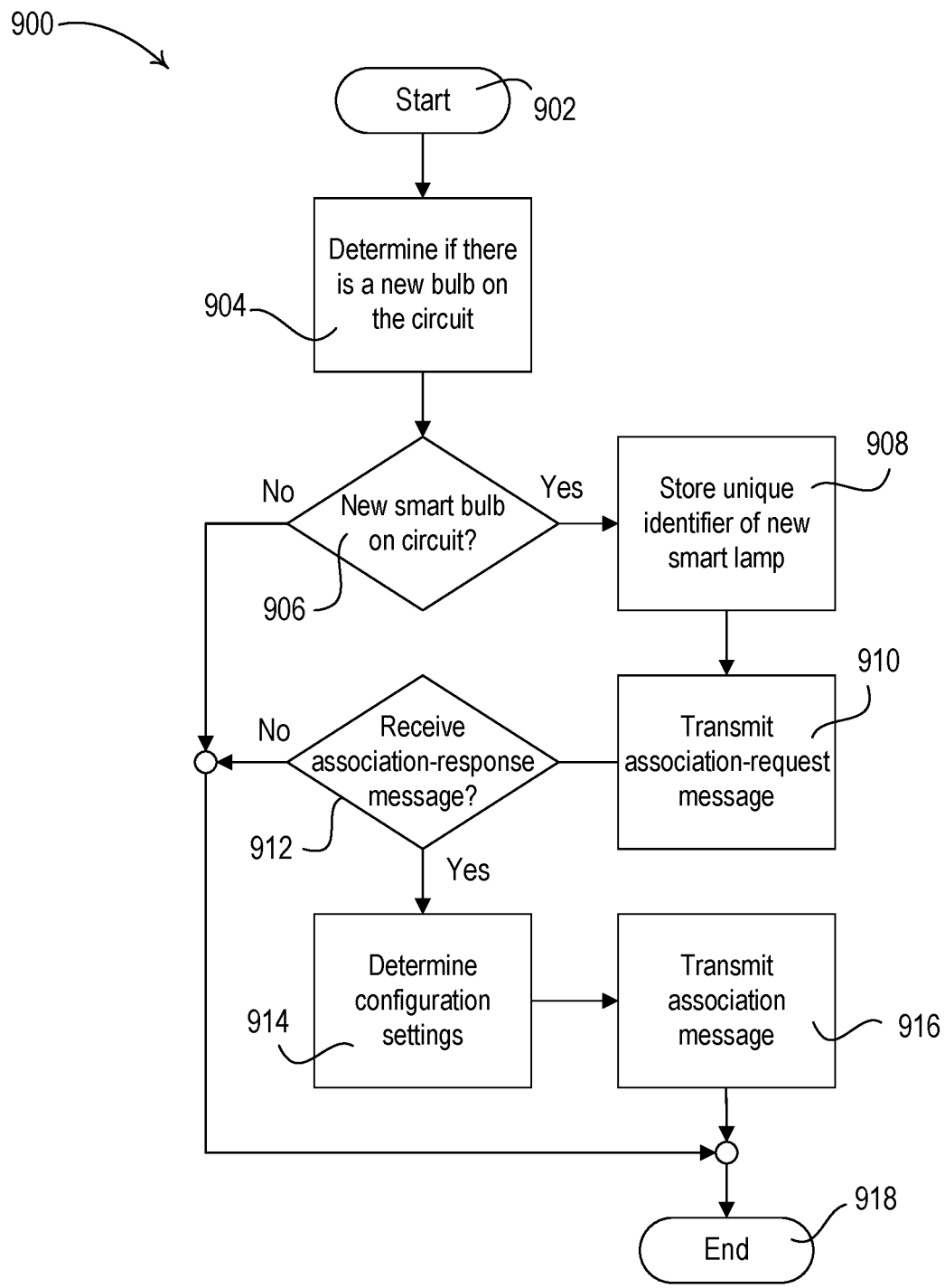
FIG. 9A is a flowchart depicting an example method that may be executed by a smart load control device to configure to associate with and configure a smart lighting device.

FIG. 9A is a flowchart depicting an example method 900 for association and configuration of a load control device with a smart bulb. The load control device may be capable of transmitting control instructions in messages (e.g., a smart load control device). The smart load control device may be a smart dimmer (e.g., such as the smart dimmer 140 shown in FIGS. 1B and 1C). The method 900 may be executed as part of a configuration procedure (e.g., a commissioning procedure). The method 900 may be implemented by one or more devices. The method 900 may be executed by a control circuit of the smart load control device (e.g., a control circuit of the smart dimmer 140 shown in FIGS. 1B and 1C, and/or the control circuit 314 of the smart load control device 300 shown in FIG. 3). For example, the control circuit may execute the method 900 periodically at 902. In addition, the control circuit may execute the method 900 may be executed at 902 in response to the smart load control device receiving power.

At 904, the control circuit of the smart load control device may determine whether a new bulb has been added (e.g., electrically connected) to the dimmed-hot circuit of the smart load control device and whether the new bulb is capable of responding to messages (e.g., is a smart bulb). For example, the smart load control device may comprise a current measurement circuit (e.g., the current measurement circuit 340) for measuring a magnitude of a load current conducted through the bulbs on the dimmed-hot circuit of the smart load control device. The control circuit may be configured to detect a change in the magnitude of the load current, which may indicate that a new bulb (e.g., a smart bulb and/or a non-smart bulb) has been installed on the dimmed-hot circuit. The control circuit may be configured to transmit a discovery-request message in response to detecting the change in the magnitude of the load current, and may determine that a new smart bulb has been added to the dimmed-hot circuit in response to receiving a response to the discovery-request message (e.g., a discovery-response message). For example, the message received by the smart bulb at 506 of the method 500 shown in FIG. 5 may be the discovery-request message transmitted by the smart load control device. In another example, the control circuit may be configured to receive a power-up message from a newly-added smart bulb, which may transmit the power-up message in response to being powered up (e.g., upon being connected to an AC power source). To confirm that the newly-added smart bulb is installed on the dimmed-hot circuit of the smart load control device, the control circuit may be configured to transmit a discovery signal on the circuit (e.g., by adjusting and/or wiggling the phase angle of the phase-control signal) in response to receiving the power-up message from the newly-added smart bulb. The control circuit may be configured to determine that a new smart bulb has been added to the dimmed-hot circuit in response to receiving a discovery-response message, which may be transmitted by the newly-added smart bulb in response to detecting the discovery signal on the dimmed-hot circuit. If a new bulb has not been added to the dimmed-hot circuit at 906, the method 900 may end at 918.

When a new smart bulb has been added to the dimmed-hot circuit at 906, the smart load control device may associate (e.g., automatically associate) with the new smart bulb. The smart load control device may store, at 908, a unique identifier of the smart bulb in memory, for example, for recognizing messages received from the new smart bulb and transmitting messages to the new smart bulb. For example, the discovery-response message (e.g., received while determining if a new smart bulb has been added to the dimmed-hot circuit at 904) may include the unique identifier of the smart bulb. The smart load control device may transmit an association-request message to the new smart bulb at 910. The association-request message may include a unique identifier of the smart load control device. The smart bulb may store the unique identifier of the smart load control device in memory. For example, the message received by the smart bulb at 506 of the method 500 shown in FIG. 5 may be the association-request message transmitted by the smart load control device at 910 of the method 900 shown in FIG. 9A. At 912, the smart load control device may determine whether an association-response message has been received, for example, from the smart bulb. For example, the smart bulb may transmit the association-response message in response to receiving the association-request message from the smart load control device. If the association-response message is not received at 912, the method 900 may end at 918.

When the smart load control device determines at 912 that the association-response message has been received from the new smart bulb, the smart load control device may determine at 914 one or more configuration settings for the new smart bulb. Upon associating with the smart bulb, the smart load control device may determine to configure the new smart bulb. The smart load control device may configure the new smart bulb with one or more configuration settings applied to another smart bulb electrically connected to the same circuit and/or a previously-installed smart bulb.

The smart load control device may transmit at 916 a configuration message to the new smart bulb. The configuration message may include the one or more configuration settings. The one or more configuration settings may include an address, a high-end intensity (e.g., high-end trim), a low-end intensity (e.g., low-end trim), a preset intensity level, a preset color, and/or a fade rate. The configuration message may also include one or more control features (e.g., operational parameters). The one or more control features may include an elongation of a dimming control curve below a pre-determined intensity threshold. The pre-determined intensity threshold may correspond to a low intensity level. For example, the elongation of the dimming control curve may enable the smart bulb to apply a first dimming control curve (e.g., such as a square law dimming curve) above the pre-determined intensity threshold and apply a second dimming control curve (e.g., such as an exponential dimming curve) at or below the pre-determined intensity threshold. In examples, the one or more control features may include color control and/or a maintained conduction mode. The color control feature may enable the smart bulb to adjust a color (e.g., color temperature) of the light emitted by the lighting load. The maintained conduction mode feature may enable the smart bulb to receive a maximum amount of power from the smart load control device and respond only to control instructions in messages. It should be appreciated that the configuration message may be combined with an association-request message. In that case, the one or more configuration settings and/or one or more control features may be sent with the unique identifier of the smart load control device to associate with and configure and/or program the new smart bulb. The method 900 may end at 918.

FIG. 9B is a flowchart depicting an example method 930 for determining whether a new smart bulb has been installed on a dimmed-hot circuit (e.g., a controlled circuit) of a load control device. The load control device may be capable of transmitting control instructions in messages (e.g., a smart load control device). The smart load control device may be a smart dimmer (e.g., such as the smart dimmer 140 shown in FIGS. 1B and 1C). The method 930 may be executed as part of a configuration procedure (e.g., a commissioning procedure). The method 930 may be implemented by one or more devices. The method 930 may be executed by a control circuit of the smart load control device (e.g., a control circuit of the smart dimmer 140 shown in FIGS. 1B and 1C, and/or the control circuit 314 of the smart load control device 300 shown in FIG. 3). For example, the control circuit may execute the method 930 at 904 of the method 900 shown in FIG. 9A. In addition, the control circuit may execute the method 930 periodically.

The method 930 may begin at 932. At 934, the control circuit of the smart load control device may determine to measure a magnitude of a load current conducted through the bulbs connected to the dimmed-hot circuit of the smart load control device. For example, the smart load control device may comprise a current measurement circuit (e.g., the current measurement circuit 340) for measuring the magnitude of the load current conducted through the dimmed-hot circuit. When the magnitude of the load current has not changed (e.g., has not changed by a threshold amount since a previous execution of the method 930) at 936, the method 930 may end at 944. When the magnitude of the load current has changed at 936, the control circuit may transmit a discovery-request message at 938 to attempt to discover if a new smart bulb has been added to the dimmed-hot circuit. When a new smart bulb that was been added to the dimmed-hot circuit receives the discovery-request message, the new smart bulb may transmit a discovery-response message in response to receiving the discovery-request message from the smart load control device. If the control circuit of the smart load control devices does not receive a discovery-response message at 940, the method 930 may end at 944. When the control circuit receives a discovery-response message from the new smart bulb at 940, the control circuit may determine that the new smart bulb has been added to the dimmed-hot circuit at 942, and the method 930 may end at 944.

FIG. 9C is a flowchart depicting an example method 950 for determining whether a new smart bulb has been installed on a dimmed-hot circuit (e.g., a controlled circuit) of a load control device. The load control device may be capable of transmitting control instructions in messages (e.g., a smart load control device). The smart load control device may be a smart dimmer (e.g., such as the smart dimmer 140 shown in FIGS. 1B and 1C). The method 950 may be executed as part of a configuration procedure (e.g., a commissioning procedure). The method 950 may be implemented by one or more devices. The method 950 may be executed by a control circuit of the smart load control device (e.g., a control circuit of the smart dimmer 140 shown in FIGS. 1B and 1C, and/or the control circuit 314 of the smart load control device 300 shown in FIG. 3). For example, the control circuit may execute the method 950 at 904 of the method 900 shown in FIG. 9A. In addition, the control circuit may execute the method 950 periodically.

The method 950 may begin at 952. At 954, the control circuit of the smart load control device may determine if a power-up message has been received from a newly-installed smart bulb. For example, the newly-installed smart bulb may transmit the power-up message in response to being powered up (e.g., upon being connected to an AC power source). If the control circuit does not receive a power-up message at 954, the method 950 may end at 962. When the control circuit receives a power-up message at 954, the control circuit may attempt to determine if the newly-installed smart bulb is coupled to the dimmed-hot circuit of the smart load control device. For example, the control circuit may generate a discovery signal on the dimmed-hot circuit at 956 to determine if the newly-installed smart bulb is coupled to the dimmed-hot circuit. The control circuit may generate the discovery signal on the dimmed-hot circuit, for example, by controlling a controllably conductive device (e.g., the controllably conductive device 310) to adjust (e.g., wiggle) the phase angle of the phase control signal on the dimmed-hot circuit. The newly-added smart bulb may be configured to transmit a discovery-response message in response to detecting the discovery signal on the dimmed-hot circuit. If the control circuit of the smart load control device does not receive a discovery-response message from the newly-installed smart bulb at 958 (e.g., the smart bulb is not installed on the dimmed-hot circuit of the smart load control device), the method 950 may end at 962. When the control circuit receives a discovery-response message from the newly-installed smart bulb at 958, the control circuit may determine that the newly-installed smart bulb has been installed on the dimmed-hot circuit of the smart load control device at 960, and the method 950 may end at 962. The smart load control device may control the newly-installed smart bulb via the phase angle until a message is sent to the smart bulb for enabling the smart bulb to be controlled according to control instructions in messages transmitted to the smart bulb, as described herein.

When a smart load control device determines that its dimmed-hot circuit is a mixed circuit, the smart load control device may go to into a maintained conduction mode (e.g., enter the maintained conduction mode). The smart load control device may determine to control the smart bulbs on the dimmed-hot circuit using control instructions in messages, and may control to turn on and off (e.g., only turn on and off) the non-smart bulbs. For example, the smart load control device may be configured to render a controllably conductive device (e.g., the controllably conductive device 310) conductive (e.g., at full conduction) and non-conductive to turn on and off, respectively, all of the bulbs on the dimmed-hot circuit. Alternatively, the smart load control device may operate in a non-dim mode during which the smart load control device may not control the smart bulbs using control instructions in message and only turning on and off all of the bulbs on the dimmed-hot circuit (e.g., using the controllably conductive device).

Figure 10:
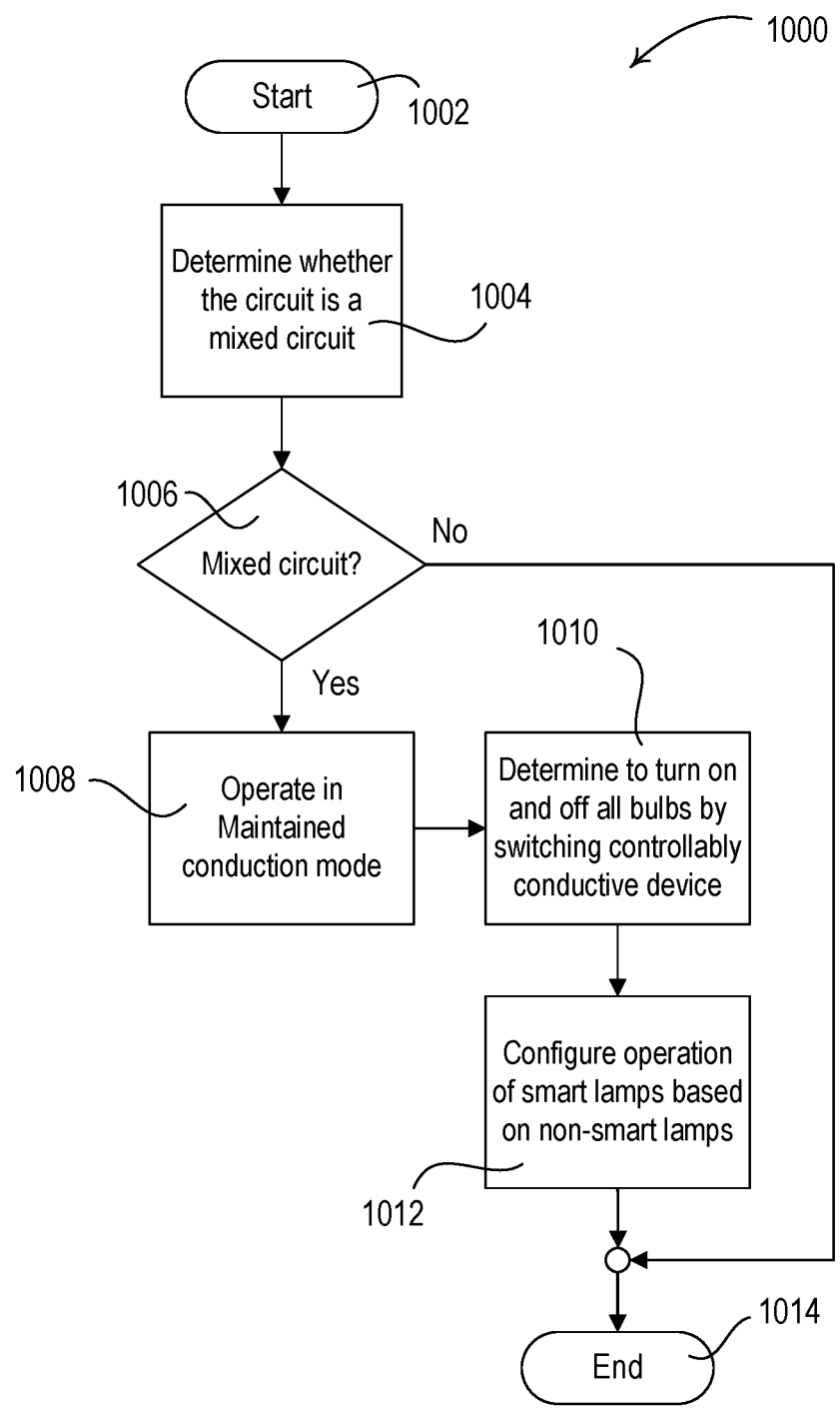
FIG. 10 is a flowchart depicting an example method for controlling lighting devices based on whether a load control device is electrically connected to a mixed circuit or a non-mixed circuit.

FIG. 10 is a flowchart depicting an example method 1000 for controlling lighting devices (e.g., the smart bulbs 120a, 120c) based on whether a load control device is electrically connected to a mixed circuit (e.g., as shown in FIG. 1C) or a non-mixed circuit (e.g., as shown in FIG. 1B). The load control device may be capable of transmitting control instructions in messages (e.g., a smart load control device). The smart load control device may be a smart dimmer (e.g., such as the smart dimmer 140 shown in FIGS. 1B and 1C). The method 1000 may be executed as part of a configuration procedure (e.g., a commissioning procedure). The method 1000 may be implemented by one or more devices. The method 1000 may be executed by a control circuit of a load control device (e.g., a control circuit of the smart dimmer 140 and/or the control circuit 314 of the smart load control device 300 shown in FIG. 3). The load control device may be capable of communicating control instructions in messages. For example, the load control device may be a smart load control device (e.g., such as smart dimmer 140 shown in FIGS. 1B and 1C). The method 1000 may be executed by the control circuit of the smart load control device (e.g., the smart dimmer 140 shown in FIG. 1C and/or the load control device 300 shown in FIG. 3) to control one or more lighting devices electrically connected to a dimmed-hot circuit controlled by the smart load control device. For example, the control circuit may execute the method 1000 periodically at 1002. In addition, the control circuit may execute the method 1000 at 1002 in response to the smart load control device determining that a lighting device has been added to the circuit. Alternatively or additionally, the control circuit may execute the method 1000 at 1002 in response to the smart load control device being added to the circuit.

At 1004, the control circuit of the smart load control device may determine whether the dimmed-hot circuit is a mixed circuit (e.g., having both smart bulbs and non-smart bulbs). The control circuit may determine whether the dimmed-hot circuit is a mixed circuit using similar techniques as performed at 806 of the method 800 shown in FIG. 8. For example, the control circuit may receive a message including an indication that the dimmed-hot circuit is a mixed circuit (e.g., from a system controller and/or a network device). In addition, the control circuit of the smart load control device may determine whether the dimmed-hot circuit is a mixed circuit in response to the light level in the area and/or in response to the magnitude of a load current conducted through the dimmed-hot circuit (e.g., as described above with reference to FIG. 8). When the dimmed-hot circuit is not a mixed circuit (e.g., the dimmed-hot circuit includes only smart bulbs or only non-smart bulbs) at 1006, the method 1000 may end at 1012.

When the dimmed-hot circuit is a mixed circuit (e.g., the dimmed-hot circuit includes at least one smart bulb and at least one non-smart bulb) at 1006, the control circuit of the smart load control device may enter a maintained conduction mode (e.g., such as a full-conduction mode) at 1008. For example, the control circuit of the smart load control device may enter the full-conduction mode by controlling the controllably conductive device into the maintained conduction mode. The maintained conduction mode may enable the smart bulbs and the non-smart bulbs of the mixed circuit to receive an amount of power from the smart load control device (e.g., the smart bulbs may respond only to control instructions in messages) that is greater than a predefined threshold. During the maintained conduction mode, the smart load control device may stay at a high-end intensity setting (e.g., an amount of power that can be provided to the bulbs electrically connected to the dimmed-hot circuit). For example, the smart load control device may control the phase angle of the phase-control signal to a maximum value when in a full-conduction mode. During the maintained conduction mode, the smart load control device may adjust the amount of power delivered to the smart bulb(s) and non-smart bulb(s) to be greater than the predefined threshold. The predefined threshold associated with the maintained conduction mode may be 70% of a maximum power level or greater.

At 1010, the control circuit of the smart load control device may determine to turn on and off the bulbs (e.g., the smart bulbs and the non-smart bulbs) on the dimmed-hot circuit by rendering the controllably conductive device conduction (e.g., at full conduction) and non-conductive, respectively. At 1012, the control circuit may configure operation of the smart bulbs for wireless control. For example, the control circuit may configure the control the smart bulbs electrically connected to the dimmed-hot circuit using control instructions in messages (e.g., while the controllably conductive device is conductive). The control instructions may be based on the non-smart bulbs that are also on the dimmed-hot circuit. For example, the control instructions may include the dimming range of the non-smart bulbs and/or a value to which the non-smart bulbs may be controlled using phase control. The method 1000 may end at 1014. Alternatively, the control circuit may omit 1012 of the method 1000 and simply turn on and off all of the bulbs (e.g., the smart bulbs and the non-smart bulbs) on the dimmed-hot circuit using the controllably conductive device (e.g., as determined at 1010).

The smart load control device may determine whether one or more light bulbs have been removed from the circuit. For example, the smart load control device may detect a change in voltage on the circuit. Additionally or alternatively, the smart load control device may not receive a response from one or more of the bulbs within a predetermined time. If the bulb(s) removed from the circuit are the smart bulbs of a mixed circuit, the smart load control device may determine whether the mixed circuit is converted to a non-mixed (e.g., non-smart) circuit. When the mixed circuit has been converted to a non-mixed (e.g., non-smart) circuit, the smart load control device may stop transmitting control instructions in messages. For example, the smart load control device may generate a phase-control signal to be provided to the bulbs. The smart load control device may control the bulbs using the phase-control signals. If the bulbs removed from the circuit include a non-smart bulb of a mixed circuit, the smart load control device may determine whether the circuit is still a mixed circuit. If removal of the non-smart bulbs converts the circuit to a non-mixed (e.g., smart) circuit, the smart load control device may enter the maintained conduction mode and control the smart bulb(s) using control instructions in messages. Replacement of the non-smart bulb(s) of a mixed circuit with smart bulb(s) may convert the mixed circuit to a non-mixed (e.g., smart) circuit.

Alternatively or additionally, the smart load control device may determine whether a bulb has been added to the circuit. In examples, the bulb may replace a previously installed (e.g., failed) bulb. In examples, the bulb may be added to a new lighting fixture added to the circuit. The smart load control device may detect a change in voltage on the circuit to determine whether a bulb has been added to the circuit. The smart load control device may determine whether the added bulb is a smart bulb or not. For example, the smart load control device may determine whether the added bulb converts a non-mixed circuit to a mixed circuit. The smart load control device may adjust its control of the bulbs based on whether the added bulb converted a non-mixed circuit to a mixed circuit. For example, the smart load control device may exit the maintained conduction mode when a non-smart bulb is added to a non-mixed (e.g., smart) circuit. The method 800 may be repeated when one or more bulbs are added to the circuit. For example, the smart load control device may repeat the method 800 when it detects that another bulb has been added to the circuit.

Alternatively or additionally, the smart bulb may determine whether the circuit is a mixed circuit based on information from the smart load control device. The smart load control device may inform the smart bulb whether the circuit is a mixed circuit. In examples, the smart bulb may receive one or more (e.g., periodic) indications from the smart load control device that indicate whether the circuit is a mixed circuit. The smart bulb may determine whether the circuit is a mixed circuit based on the indications (e.g., periodic indications) received from the smart load control device. In examples, the smart bulb may determine whether the circuit is a mixed circuit based on a change in control by the smart load control device. For example, the smart bulb may sense that the smart load control device has switched from a maintained conduction mode (e.g., and wireless control) to generating a phase-control signal. The smart bulb may determine that the circuit is a mixed circuit when the smart load control device is generating the phase-control signal.

Figure 11:
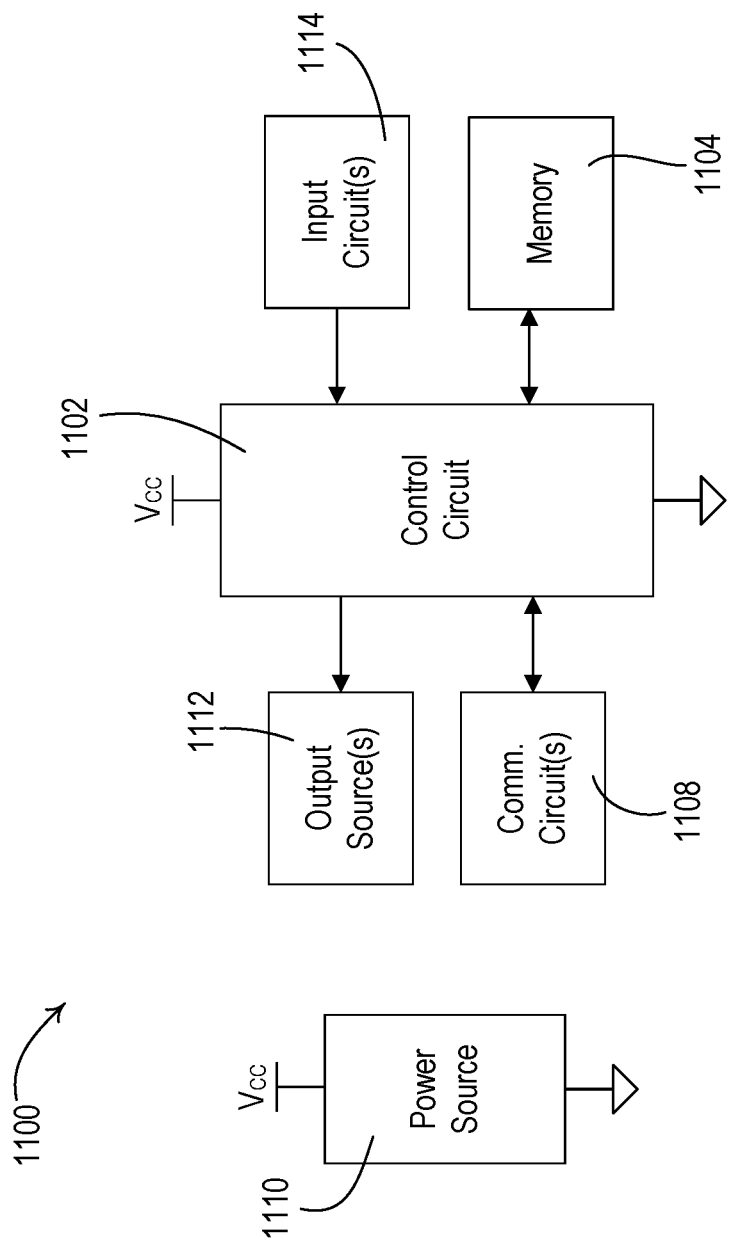
FIG. 11 is a block diagram illustrating an example of a device capable of processing and/or communication in a load control system, such as the load control system of FIG. 1.

FIG. 11 is a block diagram illustrating an example of a device 1100 capable of processing and/or communication in a load control system, such as the load control system 100 of FIG. 1. In an example, the device 1100 may be a control device capable of transmitting or receiving messages. The control device may be in an input device, such as a sensor device (e.g., an occupancy sensor, a daylight sensor, a temperature sensor, an ambient light sensor, a color temperature sensor, a window sensor, a visible light sensor, or another sensor device), a remote control device, or another input device capable of transmitting messages to load control devices or other devices in the load control system. The device 1100 may be a computing device, a mobile device, a network device, a system controller, a wearable device, or another device in the load control system.

The device 1100 may include a control circuit 1102 for controlling the functionality of the device 1100. The control circuit 1102 may include one or more general purpose processors, special purpose processors, conventional processors, digital signal processors (DSPs), microprocessors, integrated circuits, a programmable logic device (PLD), application specific integrated circuits (ASICs), or the like. The control circuit 1102 may perform signal coding, data processing, image processing, power control, input/output processing, or any other functionality that enables the device 1100 to perform as one of the devices of the load control system (e.g., load control system 100) described herein.

The control circuit 1102 may be communicatively coupled to a memory 1104 to store information in and/or retrieve information from the memory 1104. The memory 1104 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 1104 may be implemented as an external integrated circuit (IC) or as an internal circuit of the control circuit 1102.

The device 1100 may include one or more communication circuits 1108 that are in communication with the control circuit 1104 for sending and/or receiving information as described herein. The communication circuit 1108 may perform wireless and/or wired communications. The communication circuit 1108 may be a wired communication circuit capable of communicating on a wired communication link. The wired communication link may include an Ethernet communication link, an RS-485 serial communication link, a 0-10 volt analog link, a Digital Addressable Lighting Interface (DALI) digital communication link, and/or another wired communication link. The communication circuit 1108 may be configured to communicate via power lines (e.g., the power lines from which the device 1100 receives power) using a power line carrier (PLC) communication technique. The communication circuit 1108 may be a wireless communication circuit including one or more RF transmitters, receivers, transceivers, or other communication modules capable of performing wireless communications.

Though a single communication circuit 1108 may be illustrated, multiple communication circuits may be implemented in the device 1100. The device 1100 may include a communication circuit configured to communicate via one or more wired and/or wireless communication protocols and at least one other communication circuit configured to communicate via one or more other wired and/or wireless communication protocols. For example, a first communication circuit may be configured to communicate via a wired or wireless communication link, while another communication circuit may be capable of communicating on another wired or wireless communication link. The first communication circuit may be configured to communicate via a first wireless communication protocol on a network communication link and the second communication circuit may be configured to communicate via a second wireless communication protocol on a short-range communication link or a direct communication link.

The control circuit 1102 may be in communication with one or more input circuits 1114 from which input may be received. The input circuits 1114 may be included in a user interface for receiving input from the user. For example, the input circuits 1114 may include an actuator (e.g., one or more physical buttons) that may be actuated by a user to communicate user input or selections to the control circuit 1102. The actuator may be actuated to put the control circuit 1102 in an association mode and/or communicate association messages from the device 1100 or signal other information to the control circuit 1102. The actuator may be actuated to perform control by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 1102 of the device 1100 may enter the association mode, transmit an association message, transmit control instructions, or perform other functionality in response to an actuation or input from the user on the touch sensitive surface.

The input circuits 1114 may include a sensing circuit (e.g., a sensor). The sensor circuit may be an occupant sensing circuit, a light sensing circuit (e.g., an ambient light sensing circuit, a daylight sensing circuit, and/or a photo-sensing circuit), a temperature sensor circuit, a color temperature sensing circuit, a visible light sensing circuit (e.g., a camera), an audible sensing circuit (e.g., a microphone), or another sensing circuit for receiving input (e.g., sensing an environmental characteristic in the environment of the device 1100). The control circuit 1102 may receive information from the one or more input circuits 1114 and process the information for performing functions as described herein.

The control circuit 1102 may be in communication with one or more output sources 1112. The output sources 1112 may include one or more indicators (e.g., visible indicators, such as LEDs) for providing indications (e.g., feedback) to a user. The output sources 1112 may include a display (e.g., a visible display) for providing information (e.g., feedback) to a user. The control circuit 1102 and/or the display may generate a graphical user interface (GUI) generated via software for being displayed on the device 1100 (e.g., on the display of the device 1100).

The user interface of the device 1100 may combine features of the input circuits 1114 and the output sources 1112. For example, the user interface may have buttons that are actuated by the actuators of the input circuits 1114 and may be illuminated by the visible indicators or LEDs of the output sources 1112. In another example, the display and the control circuit 1102 may be in two-way communication, as the display may display information to the user and include a touch screen capable of receiving information from a user. The information received via the touch screen may be capable of providing the indicated information received from the touchscreen as information to the control circuit 1102 for performing functions or control.

Each of the hardware modules within the device 1100 may be powered by a power source 1110. The power source 1110 may include an AC power supply or DC power supply, for example. The power source 1110 may generate a supply voltage $V_{CC}$ for powering the hardware modules within the device 1100.

Although features and elements are described herein in particular combinations, each feature or element can be used alone or in any combination with the other features and elements. The methods described herein may be implemented in a computer program, software, instructions, or firmware stored on one or more non-transitory computer-readable media or other machine-readable media for execution by a computer or machine, or portion thereof. For example, the computer-readable or machine-readable media may be executed by a control circuit, such as a processor. Examples of computer-readable media or machine-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs). The control circuit may access the computer program, software, instructions, or firmware stored on the computer-readable media or machine-readable media for being executed to cause the control circuit to operate as described herein, or to operate one or more devices as described herein.

What is claimed is:

1. A load control device for controlling an amount of power delivered from an alternating-current (AC) power source to one or more lighting devices on a circuit electrically connected to the load control device, the load control device comprising:
   a controllably conductive device adapted to be electrically coupled in series between the AC power source and the one or more lighting devices;
   a user interface configured to be operated by a user;
   a wireless communication circuit configured to wirelessly communicate messages;
   a control circuit configured to:
      control the controllably conductive device to generate a phase-control signal to adjust the amount of power delivered to the one or more lighting devices;
      determine whether one or more of the lighting devices are communicating devices capable of performing digital communications;
      when each of the one or more lighting devices is determined to be a communicating device, responsive to the user interface, cause the wireless communication circuit to send control messages to the one or more lighting devices to adjust an intensity of light emitted by the one or more lighting devices; and
      when at least one of the one or more lighting devices are determined to be a non-communicating device that is incapable of performing digital communications, responsive to the user interface, control the controllably conductive device to generate the phase-control signal to adjust the intensity of light emitted by the one or more lighting devices.

2. The load control device of claim 1, wherein the control circuit is configured to determine that a lighting device has been added to the circuit.

3. The load control device of claim 2, wherein the control circuit is configured to determine that the lighting device has been added to the circuit by detecting a change in a load current of the circuit.

4. The load control device of claim 3, wherein the control circuit is configured to transmit a discovery message in response to detection of the change in the load current of the circuit.

5. The load control device of claim 3, wherein the change in the load current of the circuit is greater than a predefined threshold value.

6. The load control device of claim 2, wherein the lighting device is replacing another lighting device.

7. The load control device of claim 1, wherein the control circuit is configured to determine whether each of the communicating devices are electrically connected to the circuit.

8. The load control device of claim 7, wherein the control circuit is configured to adjust the intensity of light emitted by the communicating devices not electrically connected to the circuit and adjust one or more other parameters of the communicating devices not electrically connected to the circuit.

9. The load control device of claim 1, wherein when each of the one or more lighting devices is determined to be a communicating device, the control circuit is configured to enter a maintained-conduction mode for controlling the amount of power delivered to the one or more lighting devices.

10. The load control device of claim 9, wherein the maintained-conduction mode is a full-conduction mode.

11. The load control device of claim 9, wherein the maintained-conduction mode comprises providing a substantially constant amount of power that is at least 90% of a maximum power to the one or more lighting devices.

12. The load control device of claim 9, wherein, when in the maintained-conduction mode, the control circuit is configured to control the controllably conductive device to remain at a high-end intensity setting.

13. The load control device of claim 1, wherein when all of the one or more lighting devices are determined to be communicating devices, the control circuit is configured to automatically associate with the one or more lighting devices.

14. The load control device of claim 13, wherein the control circuit is configured to associate with the one or more lighting devices upon receipt of beacons from the one or more lighting devices.

15. The load control device of claim 13, wherein the control circuit is configured to transmit a configuration message comprising one or more configuration settings to the one or more lighting devices.

16. The load control device of claim 15, wherein the one or more configuration settings comprise one or more of an address, a high-end intensity setting, a low-end intensity setting, a preset intensity level, a preset color, or a fade rate.

17. The load control device of claim 15, wherein the one or more configuration settings are associated with one or more of a communicating device that has been replaced, the communicating devices electrically connected to the circuit, or one or more non-communicating devices electrically connected to the circuit.

18. The load control device of claim 1, wherein the control circuit is configured to determine whether one or more of the lighting devices are communicating devices in response to an added lighting device being added to the circuit.

19. The load control device of claim 18, wherein the control circuit is configured to receive, from the added lighting device via the wireless communication circuit, a first message indicating that the added lighting device is a communicating device, and subsequently transmit, to the added lighting device via the wireless communication circuit, a second message including control instructions for controlling a lighting load of the added lighting device.

20. The load control device of claim 1, wherein the control circuit is configured to control one or more communicating devices that are not electrically connected to the circuit.

21. The load control device of claim 20, wherein the control circuit is configured to send control messages to adjust an intensity of light emitted and one or more other parameters of the one or more communicating devices that are not electrically connected to the circuit.

22. The load control device of claim 21, wherein the one or more other parameters comprises a color temperature of the lighting load.

23. The load control device of claim 1, wherein, when at least one of the one or more lighting devices is determined to be a communicating device that is capable of performing digital communications, the control circuit is configured to cause the wireless communication circuit to send the control messages to adjust one or more other parameters of the at least one of the one or more lighting devices.

24. The load control device of claim 1, wherein the control circuit is configured to determine that one or more of the lighting devices are communicating devices capable of performing digital communications by being configured to:
   transmit a discovery-request message via the wireless communication circuit; and
   receive a discovery-response message from the one or more lighting devices via the wireless communication circuit.

25. The load control device of claim 24, wherein the control circuit is further configured to:
   in response to the discovery-response message, change a phase angle of the phase control signal to adjust the amount of power delivered to the one or more lighting devices as a form of feedback that the discovery-response message has been received.

26. The load control device of claim 25, wherein the control circuit is further configured to:
   receive a feedback confirmation message from the one or more lighting devices indicating that the one or more lighting devices detected the change of the phase angle of the phase control signal.

27. The load control device of claim 26, wherein the control circuit is further configured to:
   transmit a feedback confirmation request message via the wireless communication circuit to request confirmation that the one or more lighting devices detected the change of the phase angle of the phase control signal, wherein the feedback confirmation message is received in response to the transmission of the feedback confirmation request message.

28. The load control device of claim 26, wherein the control circuit is further configured to:
   transmit a configuration message that includes a unique identifier of the load control device to be used for association of the load control device with the at least one load control device.

29. The load control device of claim 1, wherein the control circuit is configured to determine that one or more of the lighting devices are communicating devices capable of performing digital communications by being configured to receive a discovery message from the one or more lighting devices via the wireless communication circuit.

30. The load control device of claim 29, wherein the discovery message is a beacon message.

31. The load control device of claim 29, wherein the control circuit is further configured to:
   in response to the discovery message received from the one or more lighting devices, change a phase angle of the phase control signal to adjust the amount of power delivered to the one or more lighting devices as a form of feedback that the discovery message has been received.

32. The load control device of claim 31, wherein the control circuit is further configured to:
   receive a feedback confirmation message from the one or more lighting devices indicating that the one or more lighting devices detected the change of the phase angle of the phase control signal.

33. The load control device of claim 32, wherein the control circuit is further configured to:
   transmit a feedback confirmation request message via the wireless communication circuit to request confirmation that the one or more lighting devices detected the change of the phase angle of the phase control signal, wherein the feedback confirmation message is received in response to the transmission of the feedback confirmation request message.

34. The load control device of claim 32, wherein the control circuit is further configured to:
   transmit a configuration message that includes a unique identifier of the load control device to be used for association of the load control device with the at least one load control device.

\* \* \* \* \*